United States Patent
Haj-Maharsi et al.

(10) Patent No.: US 9,537,388 B2
(45) Date of Patent: Jan. 3, 2017

(54) HYBRID DISTRIBUTION TRANSFORMER WITH AN INTEGRATED VOLTAGE SOURCE CONVERTER

(75) Inventors: Mohamed Y. Haj-Maharsi, Houston, TX (US); Sandeep Bala, Raleigh, NC (US); Le Tang, Cary, NC (US)

(73) Assignee: ABB Research Ltd., Zurich (CH)

( * ) Notice: Subject to any disclaimer, the term of this patent is extended or adjusted under 35 U.S.C. 154(b) by 1329 days.

(21) Appl. No.: 12/713,766

(22) Filed: Feb. 26, 2010

(65) Prior Publication Data
US 2010/0220499 A1    Sep. 2, 2010

Related U.S. Application Data

(60) Provisional application No. 61/156,300, filed on Feb. 27, 2009, provisional application No. 61/163,311, filed on Mar. 25, 2009, provisional application No. 61/223,872, filed on Jul. 8, 2009.

(51) Int. Cl.
| H02M 1/42 | (2007.01) |
| H02M 7/797 | (2006.01) |
| H02M 5/10 | (2006.01) |
| H02M 5/458 | (2006.01) |

(52) U.S. Cl.
CPC ......... H02M 1/4233 (2013.01); H02M 1/4216 (2013.01); H02M 5/10 (2013.01); H02M 5/4585 (2013.01); Y02B 70/126 (2013.01)

(58) Field of Classification Search
USPC ....... 363/15, 16, 17, 21.01, 21.04, 131, 132, 363/56.01, 56.02, 97
See application file for complete search history.

(56) References Cited

U.S. PATENT DOCUMENTS

| 3,564,390 A | 2/1971 | Stratton |
| 4,007,416 A | 2/1977 | Szatmari |
| 4,086,526 A | 4/1978 | Grudelbach |
| 4,255,782 A | 3/1981 | Joyce |
| 4,562,382 A | 12/1985 | Elliott |
| 4,774,451 A | 9/1988 | Mehnert et al. |
| 5,029,064 A | 7/1991 | Ball |
| 5,179,508 A | 1/1993 | Lange et al. |
| 5,329,222 A | 7/1994 | Gyugyi et al. |
| 5,514,915 A | 5/1996 | Kim et al. |
| 5,570,279 A | 10/1996 | Venkataramanan |

(Continued)

FOREIGN PATENT DOCUMENTS

| CN | 101335457 | 12/2008 |
| DE | 102007007921 | 8/2008 |

(Continued)

OTHER PUBLICATIONS

Bruno Georges and Jacques Aubin, Applications of PLC On-line Monitoring of Power Transformers, IEEE Xplore Digital Library, 2001, vol. 2, pp. 483-486.*

(Continued)

*Primary Examiner* — Jeffrey Sterrett
(74) *Attorney, Agent, or Firm* — Taft Stettinius & Hollister LLP

(57) ABSTRACT

A hybrid distribution transformer is provided that includes an electromagnetic transformer and a voltage source converter that is operable to reduce fluctuation in the output voltage of the hybrid distribution transformer in the event of an increase or decrease in the input voltage.

29 Claims, 34 Drawing Sheets

(56) References Cited

U.S. PATENT DOCUMENTS

| | | | |
|---|---|---|---|
| 5,602,897 A | | 2/1997 | Kociecki et al. |
| 5,625,545 A | | 4/1997 | Hammond |
| 5,724,236 A | | 3/1998 | Oglesbee |
| 5,731,969 A | | 3/1998 | Small |
| 5,747,972 A | | 5/1998 | Baretich et al. |
| 5,905,367 A | | 5/1999 | Hochgraf |
| 5,943,229 A | | 8/1999 | Sudhoff |
| 5,949,221 A | | 9/1999 | Edwards |
| 5,991,168 A | | 11/1999 | Farrington et al. |
| 6,005,788 A | | 12/1999 | Lipo et al. |
| 6,061,252 A | * | 5/2000 | Hosotani .................. 363/16 |
| 6,246,592 B1 | * | 6/2001 | Balogh et al. ............. 363/16 |
| 6,288,915 B1 | | 9/2001 | Stemmler et al. |
| 6,304,006 B1 | | 10/2001 | Jungreis |
| 6,310,787 B2 | | 10/2001 | Ito et al. |
| 6,340,851 B1 | | 1/2002 | Rinaldi et al. |
| 6,472,851 B2 | | 10/2002 | Hammond |
| 6,490,178 B1 | | 12/2002 | Asayama |
| 6,542,390 B2 | | 4/2003 | Bixel |
| 6,545,453 B2 | * | 4/2003 | Glinkowski et al. ......... 323/356 |
| 6,559,562 B1 | | 5/2003 | Rostron |
| 6,750,563 B2 | | 6/2004 | Rostron et al. |
| 6,831,442 B2 | * | 12/2004 | Hsu et al. ................ 318/803 |
| 6,879,062 B2 | | 4/2005 | Oates |
| 6,917,527 B2 | * | 7/2005 | Takada .................... 363/16 |
| 6,954,366 B2 | * | 10/2005 | Lai et al. ................. 363/71 |
| 6,987,331 B2 | * | 1/2006 | Koeppe et al. ............. 307/66 |
| 6,995,992 B2 | | 2/2006 | Wei et al. |
| 7,049,921 B2 | | 5/2006 | Owen |
| 7,050,311 B2 | | 5/2006 | Lai et al. |
| 7,362,007 B2 | | 4/2008 | Farmer |
| 7,443,054 B2 | * | 10/2008 | Pozzuoli et al. ........... 307/77 |
| 7,466,567 B2 | * | 12/2008 | Yang ..................... 363/17 |
| 7,495,410 B2 | | 2/2009 | Zargari et al. |
| 7,495,935 B2 | | 2/2009 | Chen et al. |
| 7,538,991 B2 | * | 5/2009 | Park et al. ................ 361/19 |
| 7,602,623 B2 | * | 10/2009 | Chung et al. ............. 363/56.01 |
| 7,622,825 B2 | | 11/2009 | Brune et al. |
| 7,746,669 B2 | * | 6/2010 | Falk ....................... 363/17 |
| 7,768,800 B2 | * | 8/2010 | Mazumder et al. .......... 363/17 |
| 2001/0026460 A1 | | 10/2001 | Ito et al. |
| 2002/0140403 A1 | | 10/2002 | Reddy |
| 2003/0043602 A1 | * | 3/2003 | Morita et al. ............. 363/24 |
| 2004/0084965 A1 | | 5/2004 | Welches et al. |
| 2005/0111245 A1 | | 5/2005 | Lai et al. |
| 2005/0201127 A1 | | 9/2005 | Tracy et al. |
| 2006/0006850 A1 | | 1/2006 | Inoue et al. |
| 2006/0028848 A1 | | 2/2006 | Lai et al. |
| 2006/0132062 A1 | | 6/2006 | Maru et al. |
| 2006/0221653 A1 | | 10/2006 | Lai et al. |
| 2007/0096703 A1 | | 5/2007 | Jain |
| 2007/0151272 A1 | | 7/2007 | Cosan et al. |
| 2007/0223258 A1 | | 9/2007 | Lai et al. |
| 2007/0230226 A1 | | 10/2007 | Lai et al. |
| 2008/0106425 A1 | * | 5/2008 | Deaver et al. ............. 340/646 |
| 2008/0179951 A1 | | 7/2008 | Brune et al. |
| 2008/0180055 A1 | | 7/2008 | Zargari |
| 2009/0001940 A1 | | 1/2009 | Sihler et al. |
| 2010/0201338 A1 | * | 8/2010 | Haj-Maharsi ....... H02M 1/4233 323/305 |
| 2010/0220499 A1 | * | 9/2010 | Haj-Maharsi ....... H02M 1/4216 363/13 |

FOREIGN PATENT DOCUMENTS

| | | |
|---|---|---|
| JP | 10084674 | 3/1998 |
| JP | 2004104909 | 4/2004 |
| WO | 2010091260 | 8/2010 |
| WO | 2010099459 | 9/2010 |

OTHER PUBLICATIONS

L.-S.Lai,A.Maitra,A.Mansoor, and F.Goodmann,"Multilevel Intelligent Universal Transformer for Medium Voltage Applications,"in Conf.Rec. of IEEE IAS Annual Meeting, Hong Kong, China Oct. 2005 pp. 1893-1899.

J.-S.Lai,A.Maitra, A.Mansoor, and F.Goodmann,"Performance of a Distribution Intelligent Universal Transformer under Source and Load Disturbances,"in Conf.Rec.of IEEE IAS,41st. Annual Meeting, Tampa, FL, Oct. 2006 pp. 719-725.

Ronan, Jr., E.Sudhoff, S.,Glover,S., and D.Galloway,"A Power Electronic-Based Distribution Transformer,"IEEE Transactions on Power Delivery, Apr. 2002, pp. 537-543.

Oscar C. Montero-Hernandez and Prasad N. Enjeti,"Ride-Through for Critical Loads-Exporing a Low Cost to maintaining Continuous Connections between buildings and/or industrial systems,"IEEE Industry Applications Magazine-Nov/Dec 2002-www.ieee.org/IAS.

"Feasibility Assessment for Intelligent Universal Transformer," TR-1001698, Final Report, Dec. 2002,EPRI, 3412 Hillview Aveune Palo Alto, California 94304., www.epri.com.

Z.Fedyczak, J.Kaniewski and M.Klyta, "Single-Phase Hybrid Transformer Using Matrix-Reactance Chopper with Cuk Topolog," in Power Electronics and Applications, 2007 European Conference, Aalborg,Denmark, pp. 1-10.

Jih-Sheng Lai, "Designing The Next Generation Distribution Transformers: New Power Electronic-Based Hybrid and Solid-State Design Approaches,"Proceedings of the Latest International Conference Power and Energy Systems, Feb. 24-26, 2003, Palm Springs, CA pp. 262-267.

M.Kang, P.Enjeti and I.Pitel,Analysis and Design of Electronic Transformers for Electronic Power Distribution System in IEEE Industry Applications Society Annual Meeting, New Orleans, LA Oct. 5-7, 1977.

E.C.Aeloiza, P.N.Enjeti, L.A.Moran and I.Pitel,"Next Generation Distribution Transformer:To Address Power Quality for Critical Loads," in Power Electronics Specialist Conference, 2003, PESC'03. 2003 IEEE 34th Annual Meeting pp. 1266-1271.

Z.Fedyczak and J.Kaniewski,Modeling and Analysis of Three-Phase Hybrid Transformer Using matrix Converter,in Compatibility in Power Electronics, 2007, CPE'07, Gdansk, Poland pp. 1-6.

E.R.Ronan.,Jr., S.D.Sudhoff, S.F.Glover and D.L.Galloway,"Application of Power Electronics to The Distribution Transformer," in Applied Power Electronics Conference and Exposition, 2000. APEC2000. 15th Annual, New Orleans, LA., Feb. 6-10, pp. 861-867.

P.K.Banerjee, M.A.Choudhury and Golam Toasha Rasul,"AC Voltage Regulation by Switch Mode Buck-Boost Voltage Controller,"vol. EE 31, No. I&II, Dec. 2004, pp. 27-31.

A.Julian, D.Divan, T.Lipo, F.Nozari, P.Mezs,"Double Bride Resonant DC Link Converter with Variable Input and Output Frequency," Research Report 96-07, University of Wisconsin-Madison, College of Engineering, Madison, WI 53706-1691.

Allen Hefner et al:"Recent Advances in High-Voltage, High-Frequency Silicon-Carbide Power Devices" The 2006 IEEE Industry Applications Conference Forty-First IAS Annual Meeting, Conference Record of, IEEE, Piscataway, NJ, US, Oct. 1, 2006, pp. 330-337, XP031026053, ISBN: 978-1-4244-0364-6.

M.J.Ryan,W.E.Brumsickle, and R.D.Lorenz,"Control topology option for single-phase UPS inverters," IEEE Transactions on Industry Applications, vol. 33, pp. 493-501, No. 2, Mar./Apr. 1997.

Hyosung Kim and S.Sul,"Compensation Voltage Control in Dynamic Voltage Restorers by Use of Feed Forward and State Feedback Scheme" IEEE Transactions on Power Electronics, vol. 20, pp. 1169-1177, No. 5, Sep. 2005.

M.Vilathgamuwa, A.A.D. Ranjith Perera, and S.S. Choi,Performance Improvement of the Dynamic Voltage Restorer With Closed-Loop Load Voltage and Current-Mode Control, IEEE Transactions on Power Electronics, vol. 17, pp. 824-834, No. 5, Sep. 2002.

J.-S.Lai, A.Hefner, A.Maitra and F.Goodmann,Characterization of a Multilevel HV-IGBT Module for Distribution Applications,in Industry Applications Conference, 2006. 41st. IAS Annual Meeting, Conference Record. Tampa, FL. pp. 747-753.

Chinese Office Action, CN201080009629.2 Nov. 6, 2015.

(56) References Cited

OTHER PUBLICATIONS

Chinese Office Action, CN201080009629.2, Nov. 6, 2015, English Translation.
Bruno Georges and Jacques Aubin, Application of PLC for on-line monitoring of power transformers, Power Engineering Society, Winter Meeting, 2001, IEEE, vol. 2, pp. 483-486.
Hefner, et al., "Recent Advances in High-Voltage, High-Frequency Silicon-Carbide Power Devices", The 2006 IEEE Industrial Applications Conference Forty-First IAS Annual Meeting, Conference Record of, IEEE, Piscataway, NJ, US, Oct. 1, 2006 (Oct. 1, 2006), pp. 330-337, XP031026053, ISBN:978-1-4244-0364-6.

* cited by examiner

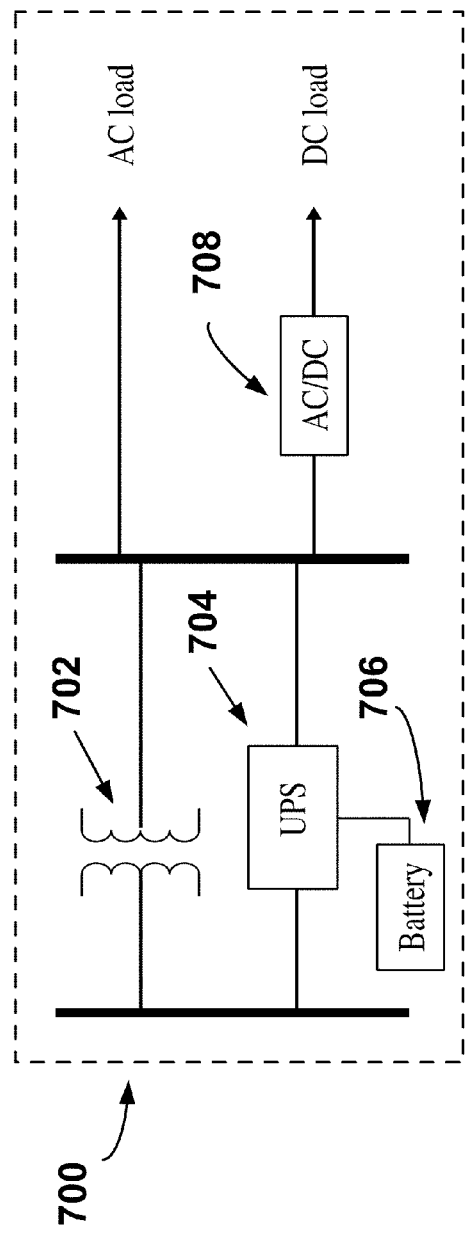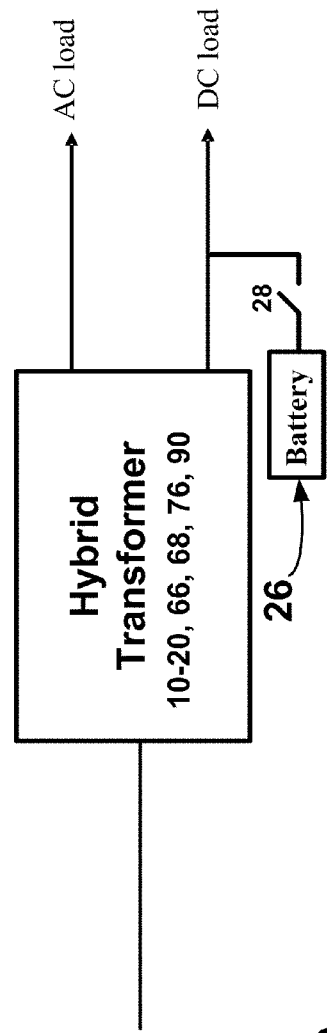
Fig. 43a
Fig. 43b

US 9,537,388 B2

HYBRID DISTRIBUTION TRANSFORMER WITH AN INTEGRATED VOLTAGE SOURCE CONVERTER

CROSS-REFERENCE TO RELATED APPLICATION

This application claims the benefit of U.S. provisional patent application No. 61/156,300 filed on Feb. 27, 2009, U.S. provisional patent application No. 61/163,311 filed on Mar. 25, 2009 and U.S. provisional patent application No. 61/223,872 filed on Jul. 8, 2009, all of which are hereby incorporated by reference in their entirety.

BACKGROUND OF THE INVENTION

This invention relates to transformers and more particularly to a hybrid distribution transformer utilizing power electronics.

Modern society's movement into the digital age is necessitating the development of a more reliable supply of high-quality electricity. An indispensable component in the supply of electricity to end-users is a distribution transformer. A conventional distribution transformer converts electricity at one voltage to electricity at another voltage, either of higher or lower value. A transformer achieves this voltage conversion using a primary winding and a secondary winding, each of which is wound on a ferromagnetic core and comprises a number of turns of an electrical conductor. A conventional distribution transformer employed in present day power distribution systems cannot protect digital loads against poor power quality, such as sags/swells/distortion. It is estimated that voltage disturbances cost millions of dollars every year to industries around the world.

Sometimes systems are connected to a power distribution line to improve power quality. Examples of such systems include dynamic voltage restorers (DVRs) and static VAR compensators (SVCs). DVRs sustain or restore an operational electric load during sags or spikes in voltage supply, while SVCs provide fast-acting reactive power compensation on power networks. DVRs and SVCs are often "add on" systems that are connected to, and used with, conventional distribution transformers.

More recently, it has been proposed to combine power electronics with a conventional distribution transformer to improve power quality. The present invention is directed to such a transformer.

SUMMARY OF THE INVENTION

In accordance with the present invention, a hybrid distribution transformer is provided having a primary side for receiving input voltage and current from a source and a secondary side for providing output voltage and current to a load. The hybrid transformer includes a ferromagnetic core and a winding structure that includes first and second windings wound around the core. One of the first and second windings is a primary winding for connection to the source and one of the first and second windings is a secondary winding for connection to the load. A voltage source converter is connected to the first winding and is operable to convert between DC and AC voltages. The voltage source converter is connected to the first winding and includes at least one switching bridge that has two or more switching devices. A DC bus is connected in parallel with the at least one switching bridge. A controller is operable to control the at least one switching bridge to control the power factor on the primary side of the hybrid transformer and to reduce variations in the output voltage in the event of a change in the input voltage.

BRIEF DESCRIPTION OF THE DRAWINGS

The features, aspects, and advantages of the present invention will become better understood with regard to the following description, appended claims, and accompanying drawings where:

FIG. 43 shows an application of a hybrid transformer of the present invention for a datacenter where AC and DC loads are powered by the hybrid transformer.

DETAILED DESCRIPTION OF ILLUSTRATIVE EMBODIMENTS

Figure 1:
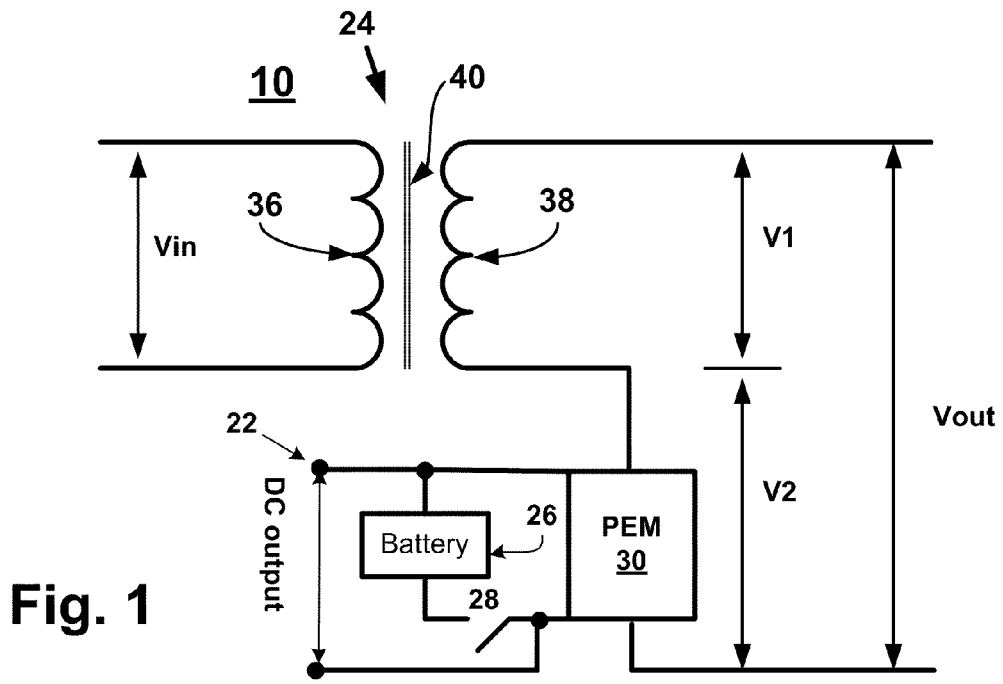
FIG. 1 shows a schematic circuit of a first hybrid transformer constructed in accordance with a first embodiment of the present invention.
Figure 2:
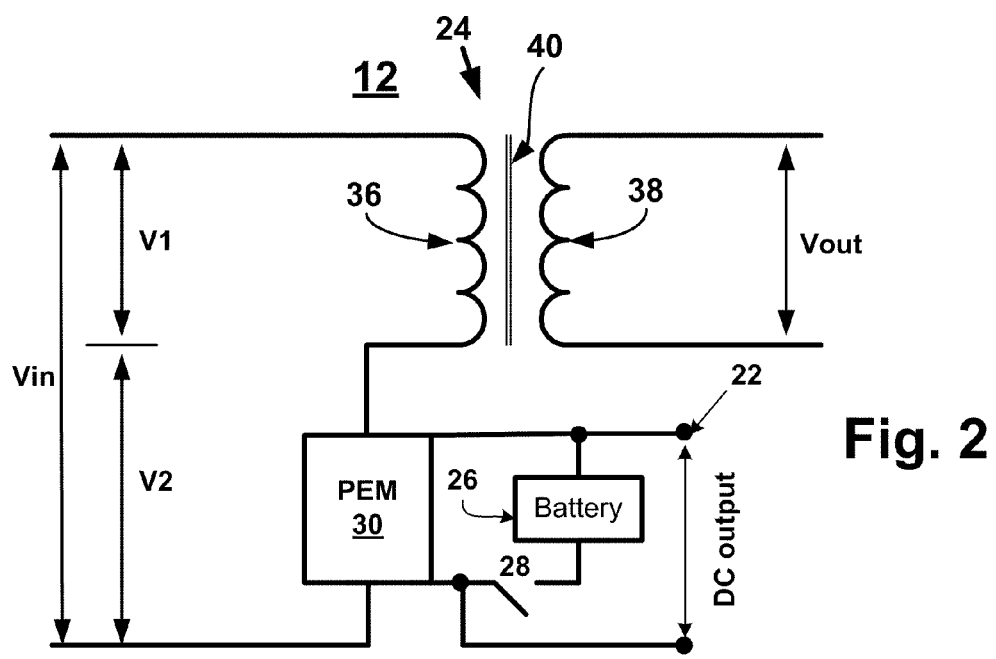
FIG. 2 shows a schematic circuit of a second hybrid transformer constructed in accordance with a second embodiment of the present invention.
Figure 3:
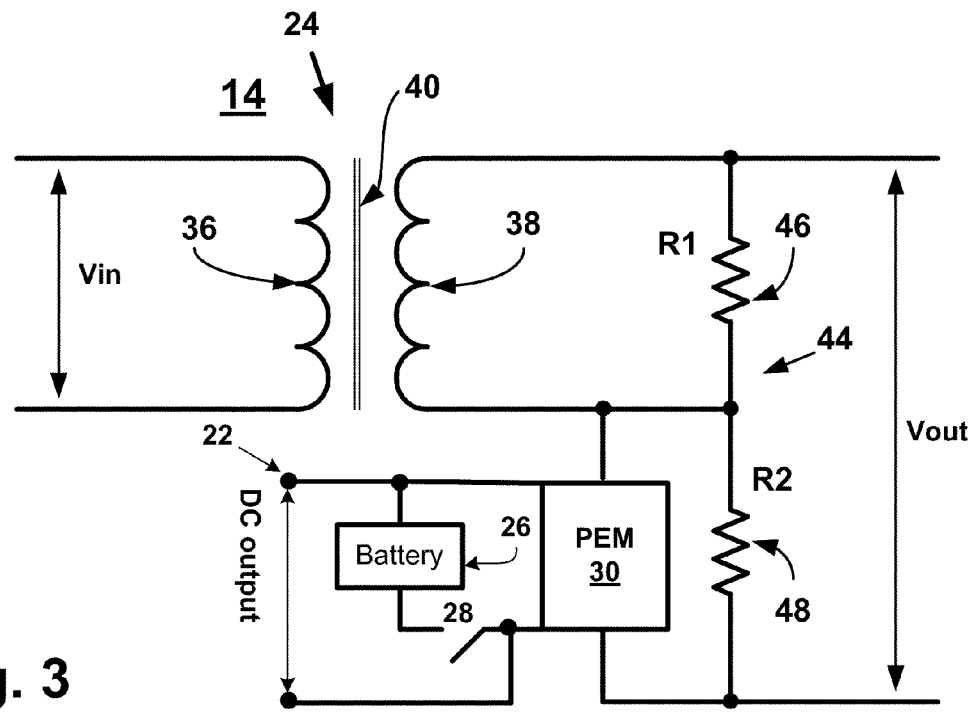
FIG. 3 shows a schematic circuit of a third hybrid transformer constructed in accordance with a third embodiment of the present invention.
Figure 4:
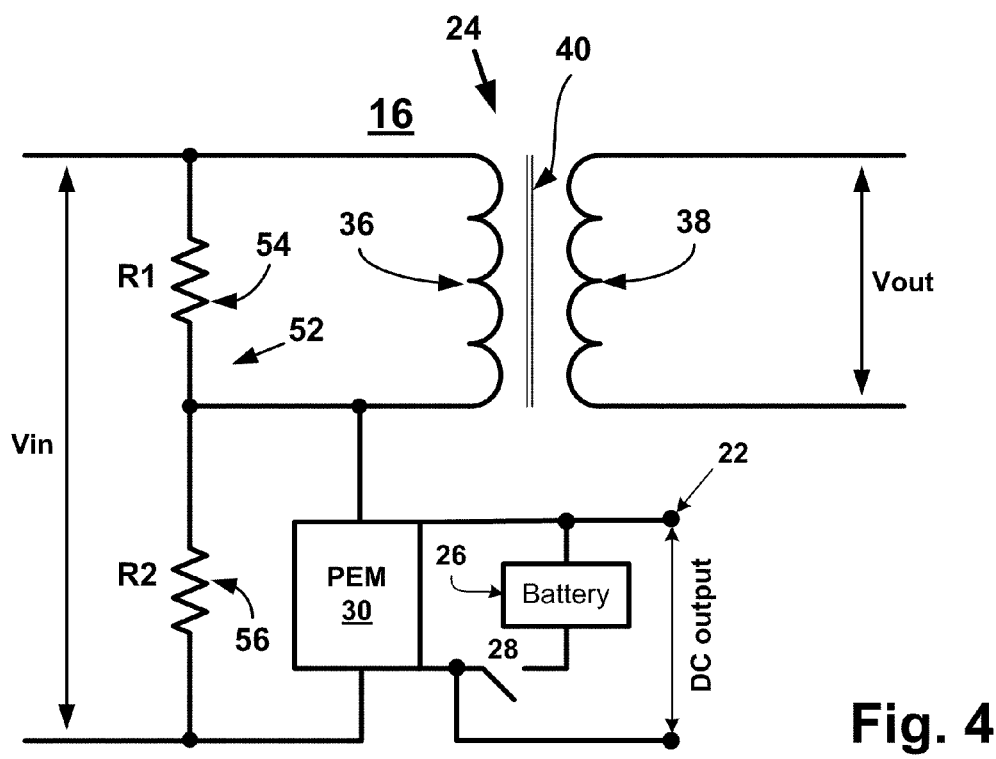
FIG. 4 shows a schematic circuit of a fourth hybrid transformer constructed in accordance with a fourth embodiment of the present invention.
Figure 5:
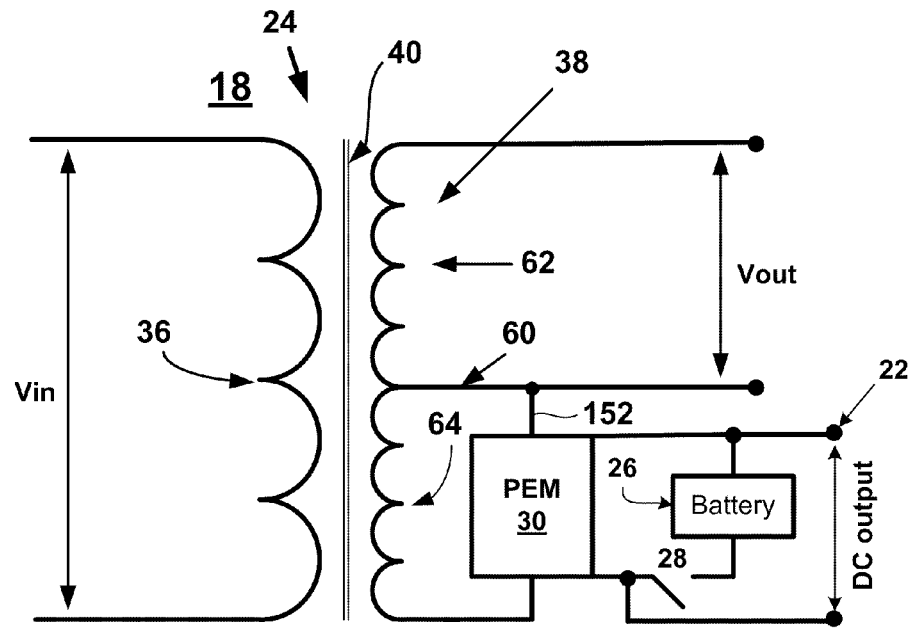
FIG. 5 shows a schematic circuit of a fifth hybrid transformer constructed in accordance with a fifth embodiment of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is directed to a hybrid transformer that may be used in the distribution of power. The hybrid transformer generally includes an electromagnetic transformer that is integrated with a power electronic module (PEM) comprising a voltage source converter (VSC) that is operable to convert between DC and AC voltages, i.e., to convert DC voltage to AC voltage and vice versa. The electromagnetic transformer includes a ferromagnetic core, a primary winding structure and a secondary winding structure, each of which are wound on the ferromagnetic core. The primary winding structure comprises one or more primary windings and the secondary winding structure comprises one or more secondary windings. The PEM can be connected into the primary winding structure or the secondary winding structure. The electromagnetic transformer may be a liquid-filled transformer, wherein the core and the primary and secondary winding structures are immersed in a dielectric fluid, or the electromagnetic transformer may be a dry type transformer, wherein the core and the primary and secondary winding structures are not immersed in a dielectric fluid, but, instead, are encased in a dielectric resin or surrounded by an inert gas, or simply ambient air. The hybrid transformer may be a single phase transformer, a three phase transformer, or a multiphase (>3 phases) transformer. The hybrid transformer may be pole-mounted or pad-mounted. A single phase embodiment of the hybrid transformer may have a power rating of about 67 kVA and a voltage rating of about 7.97 kV to 277 V.

Six embodiments of a hybrid distribution transformer constructed in accordance with the present invention are shown in FIGS. 1-5 and are designated by the reference numerals 10, 12, 14, 16, 18, 20, respectively. Each of the hybrid transformers 10-20 generally includes an electromagnetic transformer 24 and a PEM 30. The electromagnetic transformer 24 has a single primary winding 36 and a single secondary winding 38 wound around a ferromagnetic core 40. The PEM 30 comprises a DC bus that can be used to power DC loads. The DC bus is connected to DC output terminals 22 of the hybrid transformer 10-20. An energy storage device, such as a battery bank 26, can be connected across the DC output terminals 22 using a switch 28.

In the hybrid transformer 10 (shown in FIG. 1), the PEM 30 is connected to an end of the secondary winding 38. The voltage Vout across the secondary winding structure is equal to the voltage V1 across the secondary winding 38 plus the voltage V2 across the PEM 30. Since the output voltage equals the voltage output from the PEM 30 plus the voltage of the secondary winding 38, control of the voltage output from the PEM 30 controls the output voltage of the hybrid transformer 10.

In the hybrid transformer 12 (shown in FIG. 2), the PEM 30 is connected to an end of the primary winding 36. The voltage Vin across the primary winding structure is equal to the voltage V1 across the primary winding 36 plus the voltage V2 across the PEM 30. Since the input voltage equals the voltage output from the PEM 30 plus the voltage of the primary winding 36, control of the voltage output from the PEM 30 controls the input voltage and, thus, the output voltage of the hybrid transformer 12.

The hybrid transformer 14 (shown in FIG. 3) has substantially the same construction as the hybrid transformer 10, except a voltage divider 44 is connected into the secondary winding structure. The voltage divider 44 includes a pair of series connected resistors 46, 48 connected in parallel with the secondary winding 38 and the PEM 30. An output of the voltage divider 44 is connected to a node in the connection between the secondary winding 38 and the PEM 30. The resistances of the resistors 46, 48 are selected to balance the voltage between the secondary winding 38 and the PEM 30.

The hybrid transformer 16 (shown in FIG. 4) has substantially the same construction as the hybrid transformer 12, except a voltage divider 52 is connected into the primary winding structure. The voltage divider 52 includes a pair of series connected resistors 54, 56 connected in parallel with the primary winding 36 and the PEM 30. An output of the voltage divider 52 is connected to a node in the connection between the primary winding 36 and the PEM 30. The resistances of the resistors 54, 56 are selected to balance the voltage between the primary winding 36 and the PEM 30.

In the hybrid transformer 18 (shown in FIG. 5), the secondary winding 38 has one or more taps. Each tap is connected to a turn of the secondary winding 38, between ends of the secondary winding 38. An inner tap 60 divides the secondary winding 38 into two winding portions 62 and 64. The winding portion 62 is formed by the inner tap 60 and a first extremity of the secondary winding 38 or, alternately, another, outer tap. Similarly, the winding portion 64 is formed by the inner tap 60 and a second extremity of the secondary winding 38 or, alternately, another, outer tap. The PEM 30 is connected in parallel to the winding portion 64 of the secondary winding 38, with the inner tap 60 being connected to the line 152 of the PEM 30. The voltage output Vout of the hybrid transformer 18 is equal to the voltage across the winding portion 62 only.

Figure 6:
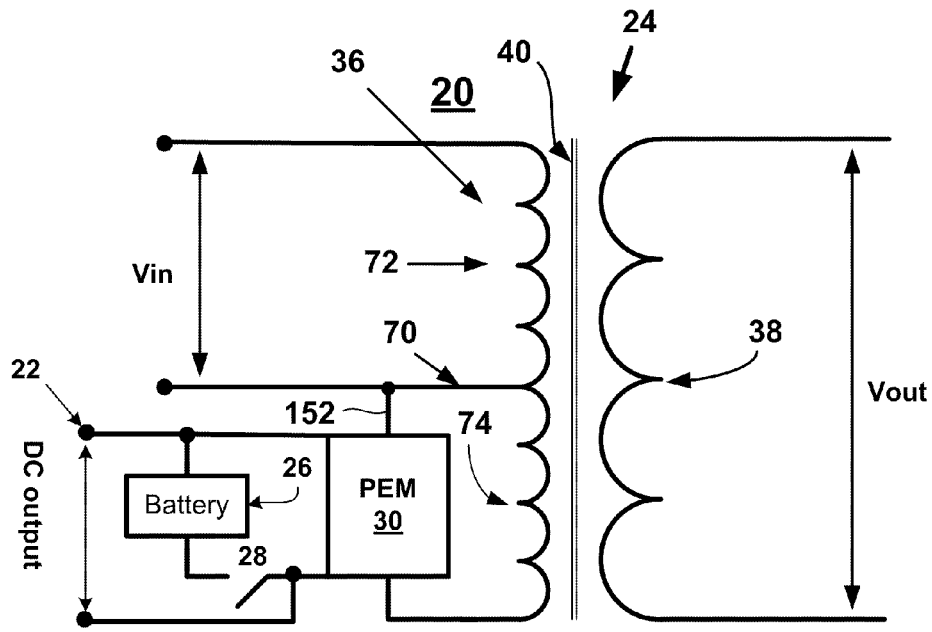
FIG. 6 shows a schematic circuit of a sixth hybrid transformer constructed in accordance with a sixth embodiment of the present invention.

In the hybrid transformer 20 (shown in FIG. 6), the primary winding 36 has one or more taps. Each tap is connected to a turn of the primary winding 36, between ends of the primary winding 36. An inner tap 70 divides the primary winding 36 into two winding portions 72 and 74. The winding portion 72 is formed by the inner tap 70 and a first extremity of the primary winding 36 or, alternately, another, outer tap. Similarly, the winding portion 74 is formed by the inner tap 70 and a second extremity of the primary winding 36 or, alternately, another, outer tap. The PEM 30 is connected in parallel to the winding portion 74 of the primary winding 36, with the inner tap 70 being connected to the line 152 of the PEM 30. The voltage across the winding portion 72 is equal to the voltage input to the hybrid transformer 20, Vin.

Figure 7:
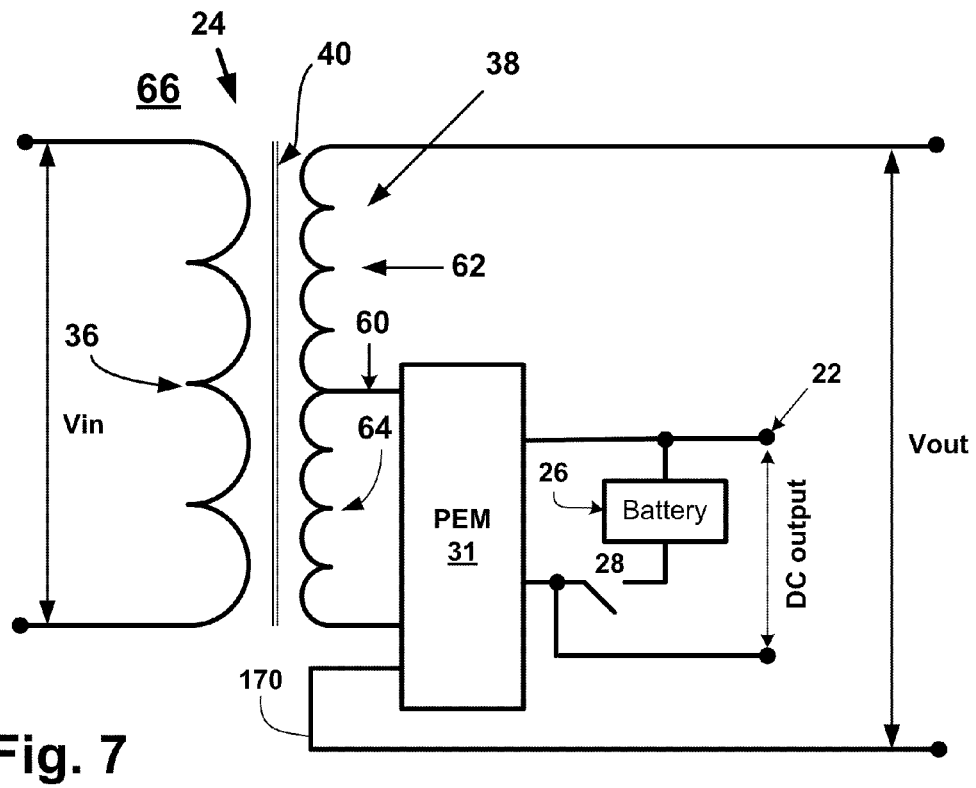
FIG. 7 shows a schematic circuit of a seventh hybrid transformer constructed in accordance with a seventh embodiment of the present invention.

A seventh embodiment of a hybrid transformer constructed in accordance with the present invention is shown in FIG. 7 and is designated by the reference numeral 66. The hybrid transformer 66 has substantially the same construction as the hybrid transformer 18, except the hybrid transformer 66 has a PEM 31. In addition, the PEM 31 is connected such that the output terminals of the hybrid transformer 66 are connected to the first extremity of the secondary winding 38 (or an outer tap) and an output line 170 from the PEM 31.

Figure 8:
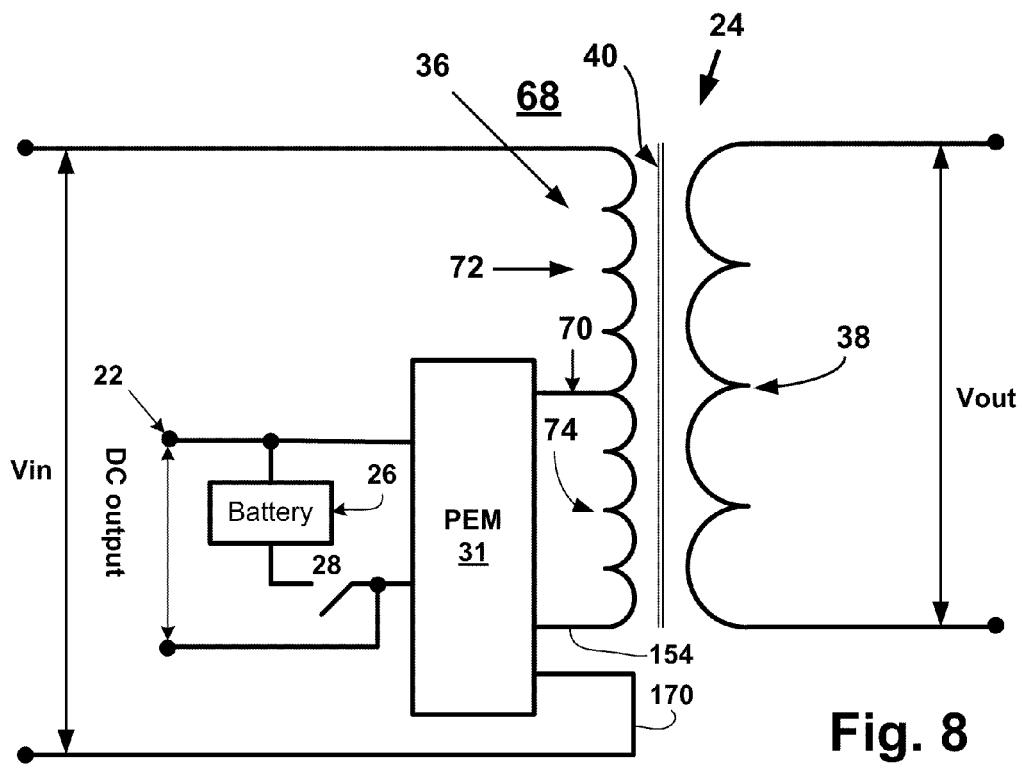
FIG. 8 shows a schematic circuit of an eighth hybrid transformer constructed in accordance with an eighth embodiment of the present invention.

An eighth embodiment of a hybrid transformer constructed in accordance with the present invention is shown in FIG. 8 and is designated by the reference numeral 68. The hybrid transformer 68 has substantially the same construction as the hybrid transformer 20, except the hybrid transformer 68 has a PEM 31. In addition, the PEM 31 is connected such that the input terminals of the hybrid transformer 68 are connected to the first extremity of the primary winding 36 (or an outer tap) and the line 170 from the PEM 31.

Figure 9:
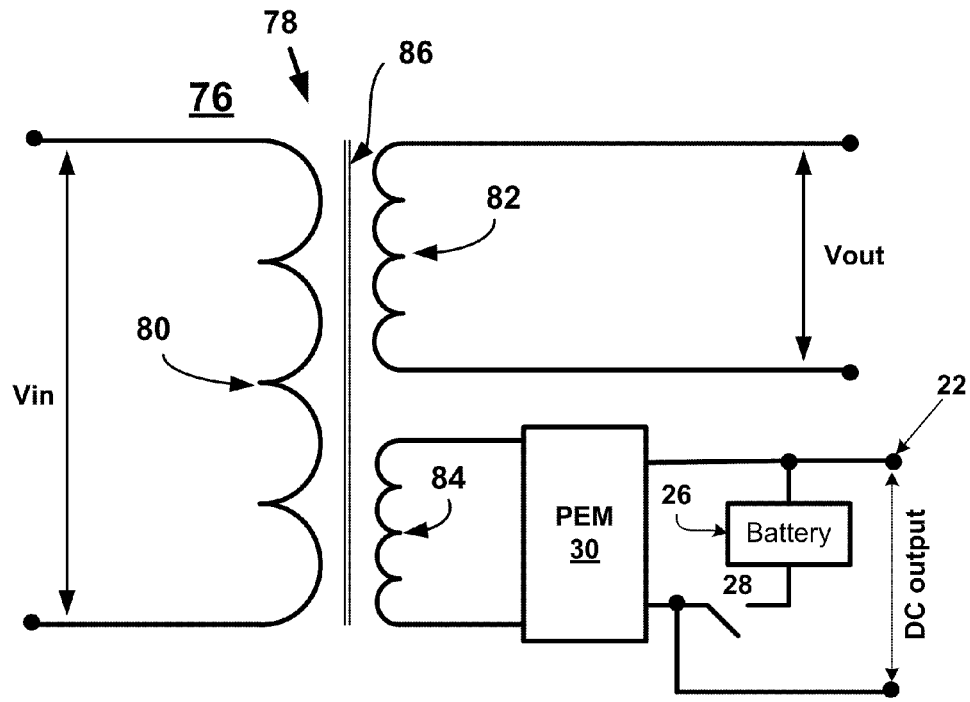
FIG. 9 shows a schematic circuit of a ninth hybrid transformer constructed in accordance with a ninth embodiment of the present invention.

A ninth embodiment of a hybrid transformer constructed in accordance with the present invention is shown in FIG. 9 and is designated by the reference numeral 76. The hybrid transformer 76 includes an electromagnetic transformer 78, which has a single primary winding 80 and a pair of secondary windings 82, 84 wound around a ferromagnetic core 86. The PEM 30 is connected to ends of the secondary winding 84.

Figure 10:
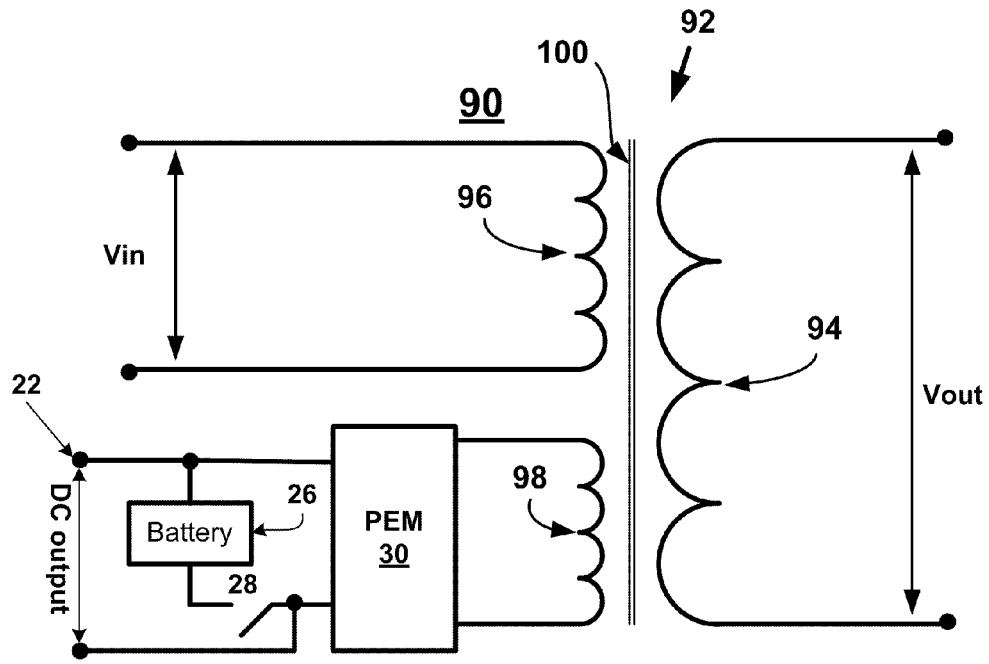
FIG. 10 shows a schematic circuit of a tenth hybrid transformer constructed in accordance with a tenth embodiment of the present invention.

A tenth embodiment of a transformer constructed in accordance with the present invention is shown in FIG. 10 and is designated by the reference numeral 90. The hybrid transformer 90 includes an electromagnetic transformer 92, which has a single secondary winding 94 and a pair of primary windings 96, 98 wound around a ferromagnetic core 100. The PEM 30 is connected to ends of the primary winding 98.

Figure 11:
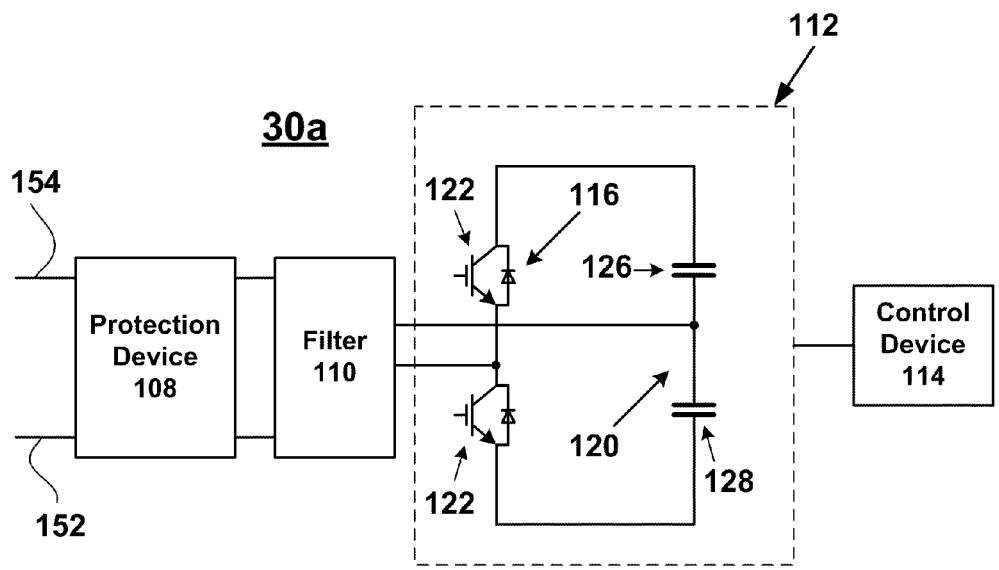
FIG. 11 shows a schematic circuit of a first power electronic module (PEM) that may be used in the single phase hybrid transformers of the present invention.
Figure 12:
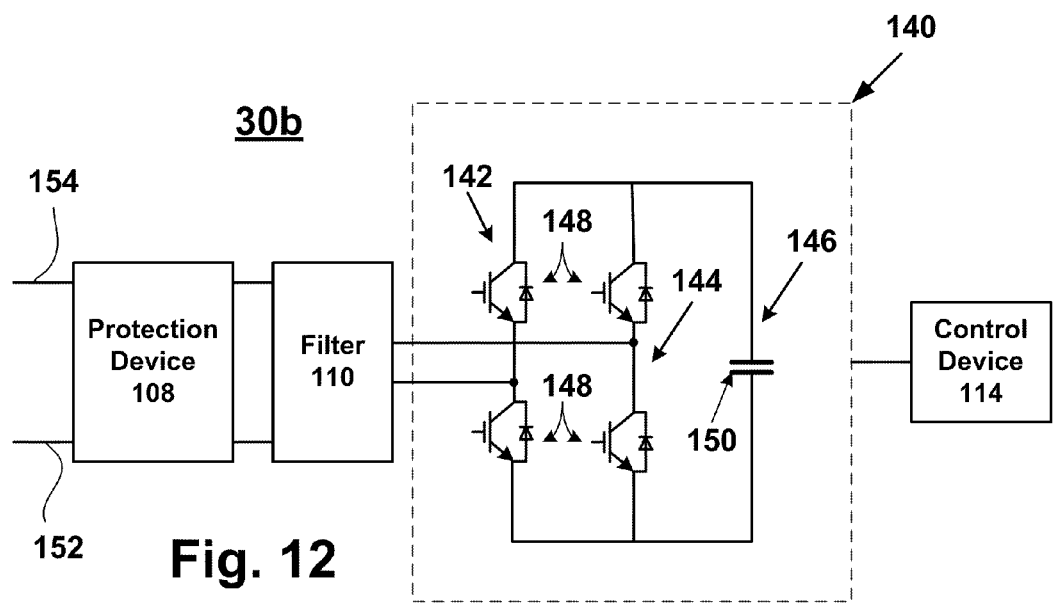
FIG. 12 shows a schematic circuit of a second PEM that may be used in the single phase hybrid transformers of the present invention.
Figure 13:
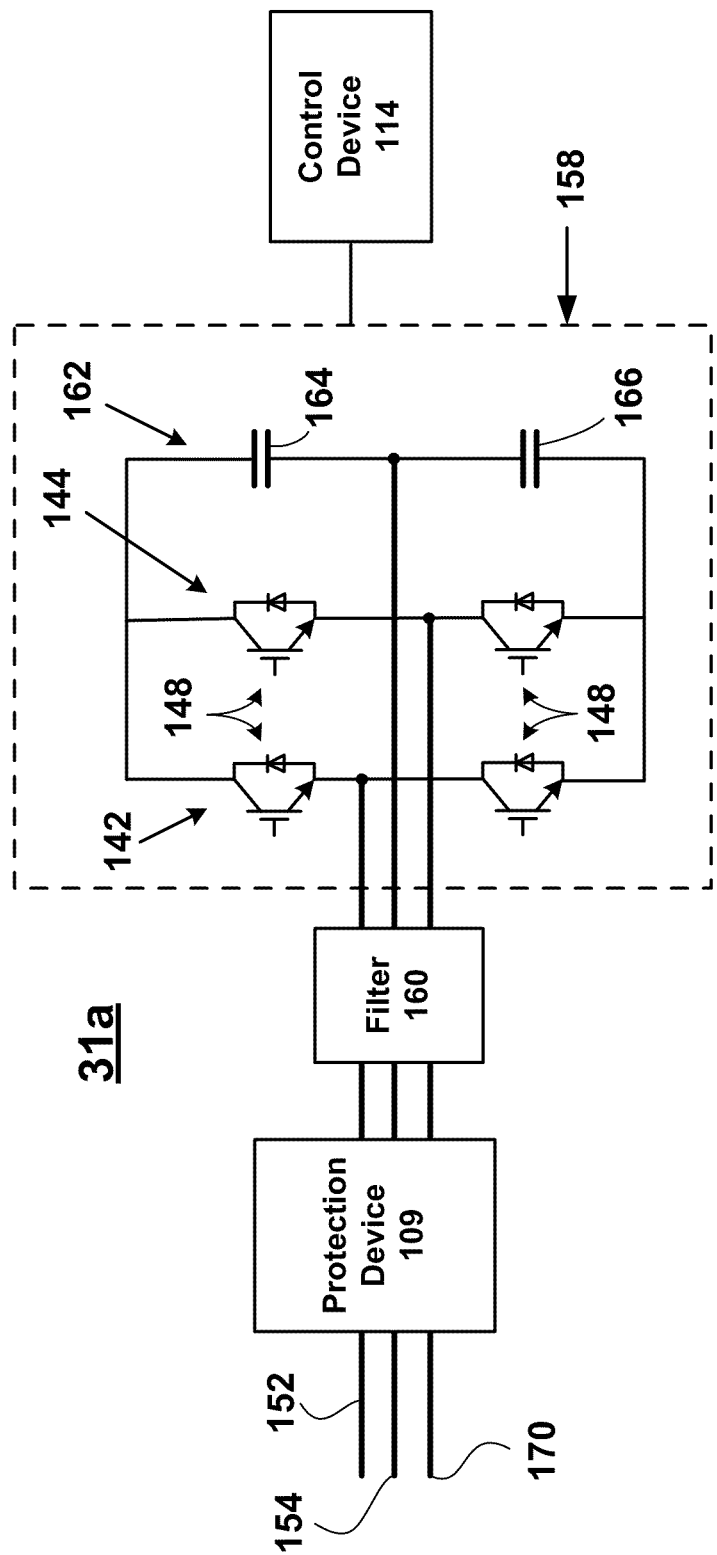
FIG. 13 shows a schematic circuit of a third PEM that may be used in the single phase hybrid transformers of the present invention.
Figure 14:
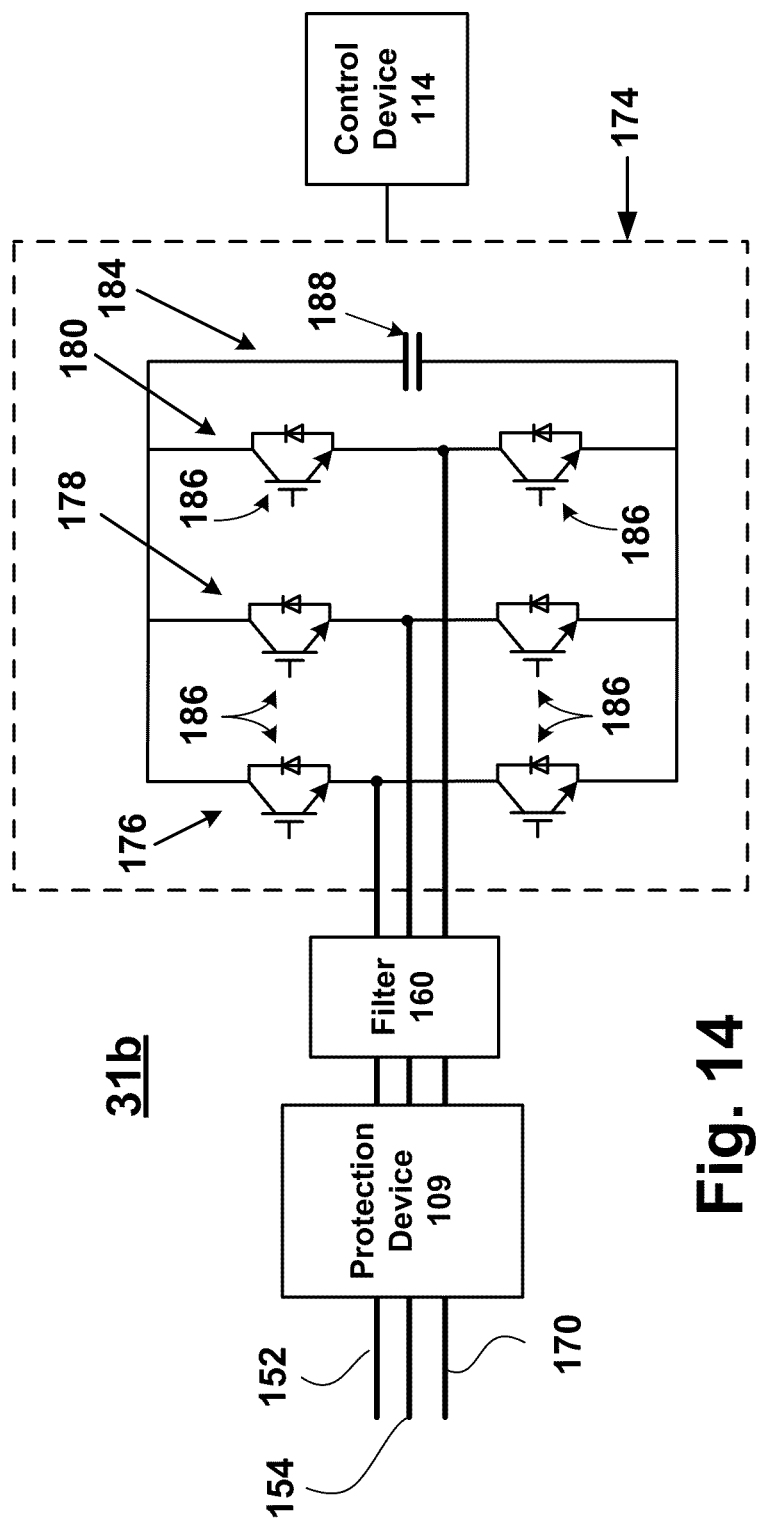
FIG. 14 shows a schematic circuit of a fourth PEM that may be used in the single phase hybrid transformers of the present invention.

The PEM 30, 31 may have one of a plurality of different configurations. Generally, however, the PEM 30, 31 comprises a VSC, a protection device, a filter and a control device. Two different configurations of the PEM 30 are shown in FIGS. 11 and 12 and are designated by the reference numerals 30a, 30b, respectively. Two different configurations of the PEM 31 are shown in FIGS. 13 and 14 and are designated by the reference numerals 31a, 31b, respectively.

Referring now to FIG. 11, the PEM 30a comprises a protection device 108, a filter 110, a VSC 112 and a control device 114. The VSC 112 is a half bridge inverter comprising a switching bridge 116 connected in parallel to a DC bus 120. A DC voltage from the DC bus 120 is converted to a sinusoidal AC voltage by the switching bridge 116. The switching bridge 116 includes a pair of switching devices 122 connected in series. Each switching device 122 may be an insulated gate bipolar transistor (IGBT) and an anti-parallel diode. The DC bus 120 includes a pair of capacitors 126, 128 connected in series. A first line 152 is connected to the switching bridge 116, between the switching devices 122 and a second line 154 is connected to the DC bus 120 between the capacitors 126, 128. The protection device 108 and the filter 110 are connected into the first and second lines 152, 154. The control device 114 controls the operation of the switching devices 122. The DC bus 120 is connected to the DC output terminals 22 of the hybrid transformer.

Referring now to FIG. 12, the PEM 30b comprises a protection device 108, a filter 110, a VSC 140 and a control device 114. VSC 140 is a full or H-bridge inverter comprising first and second switching bridges 142, 144 connected in parallel with a DC bus 146. A DC voltage from the DC bus 146 is converted to a sinusoidal AC voltage by the first and second switching bridges 142, 144. Each of the first and second switching bridges 142, 144 includes a pair of switching devices 148 connected in series. Each switching device 148 may be an insulated gate bipolar transistor (IGBT) and an anti-parallel diode. The DC bus 146 includes one or more capacitors 150. A first line 152 is connected to the first switching bridge 142 between the switching devices 148 and a second line 154 is connected to the second switching bridge 144 between the switching devices 148. The protection device 108 and the filter 110 are connected into the first and second lines 152, 154. The control device 114 controls the operation of the switching devices 148. The DC bus 146 is connected to the DC output terminals 22 of the hybrid transformer.

It should be appreciated that the PEM 30a may be preferred for use in a secondary winding structure, such as in hybrid transformers 10, 14, 18, while the PEM 30b may be preferred for use in a primary winding structure, such as in hybrid transformers 12, 16, 20. It should further be appreciated that other VSC topologies may utilized in lieu of the VSC 112 and the VSC 140.

Referring now to FIG. 13, the PEM 31*a* is similar to the PEM 30*b* and includes a protection device 109, a VSC 158, a filter 160 and a control device 114. The VSC 158 has substantially the same construction as the VSC 140, except the VSC 158 has a DC bus 162 with two capacitors 164, 166 and the second line 154 is connected between the capacitors 164, 166. A third line 170 is connected to the second switching bridge 144 between the switching devices 148. The DC bus 162 is connected to the DC output terminals 22 of the hybrid transformer. The protection device 109 and the filter 160 are connected into the first, second and third lines 152, 154, 170.

Referring now to FIG. 14, the PEM 31*b* includes a protection device 109, a VSC 174, a filter 160 and a control device 114. The VSC 174 comprises first, second and third switching legs 176, 178, 180 connected in parallel to a DC bus 184. Each of the first, second and third switching legs 176-180 includes a pair of switching devices 186 connected in series. The control device 114 controls the operation of the switching devices 186. Each switching device 186 may be an insulated gate bipolar transistor (IGBT) and an antiparallel diode. Other components and configurations, however, may be used for each switching device 186. For example, a combination of parallel-connected switches (IGBT or otherwise) and diodes may be used for each switching device 186. The DC bus 184 includes a capacitor 188 and is connected to the DC output terminals 22 of the hybrid transformer. DC voltage from the DC bus 184 is converted to a sinusoidal AC voltage by the first, second and third switching legs 176-180. The first line 152 is connected through the protection device 109 and the filter 160 to the first switching leg 176 located between the switching devices 186. The second line 154 is connected through the protection device 109 and the filter 160 to the second switching leg 178 located between the switching devices 186. The third line 170 is connected through the protection device 109 and the filter 160 to the third switching leg 180 located between the switching devices 186.

Figure 15:
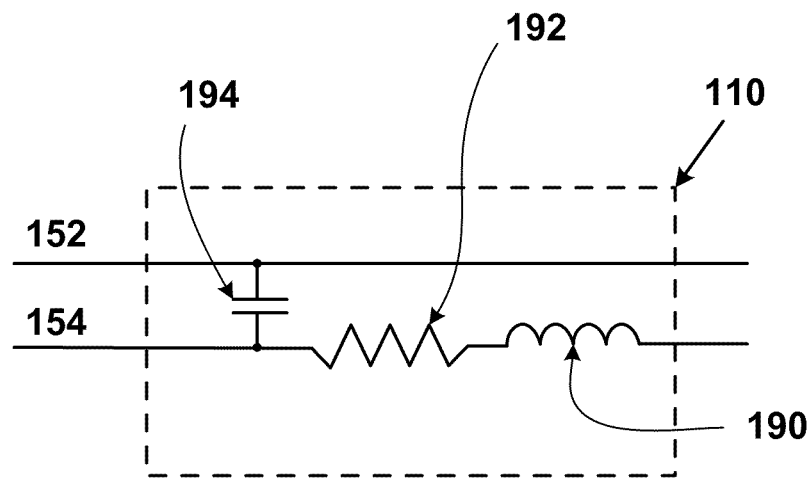
FIG. 15 shows a schematic circuit of a first filter that may be used in the first and second PEMs.
Figure 16:
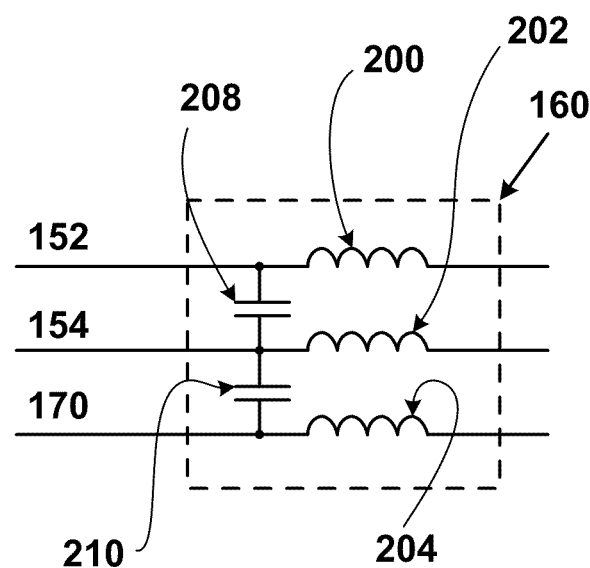
FIG. 16 shows a schematic circuit of a second filter that may be used in the third and fourth PEMs.

Referring now to FIGS. 15 and 16, the filters 110, 160 help prevent high frequency harmonics from being introduced into the output voltage of the hybrid transformers 10-20, 66, 68, 76, 90 and the currents in the primary and secondary windings of their electromagnetic transformers as a result of the switching of the switching devices 122, 148, 186.

The filter 110 comprises an inductor 190 and a resistor 192 connected in series in the second line 154 and a capacitor 194 connected in parallel between the first and second lines 152, 154.

The filter 160 comprises inductors 200, 202, 204 connected into the first, second and third lines 152, 154, 170, respectively. A capacitor 208 is connected in parallel between the first and second lines 152, 154 and a capacitor 210 is connected in parallel between the second and third lines 154, 170, respectively.

It should be appreciated that the filters 110, 160 may have topologies other than those shown and described.

Figure 18:
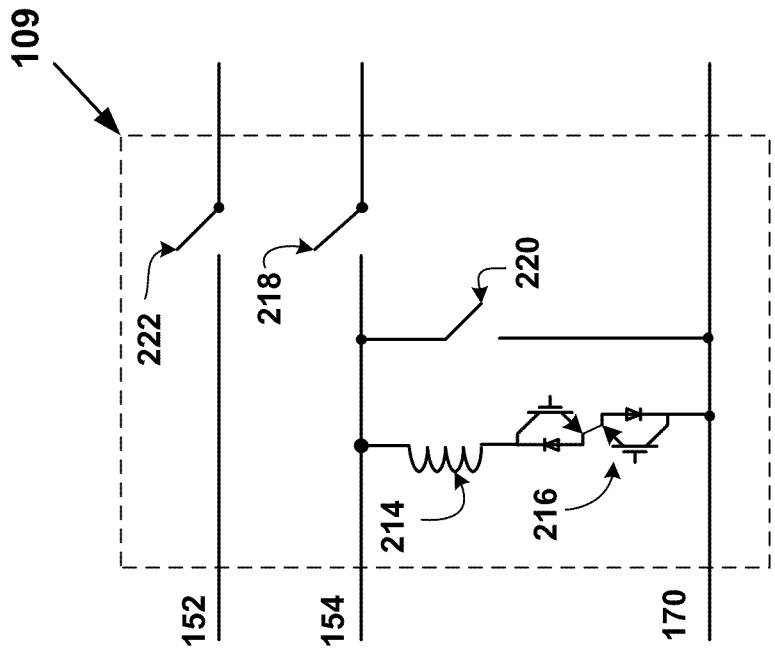
FIG. 18 shows a schematic circuit of a second protection device that may be used in the third and fourth PEMs.
Figure 17:
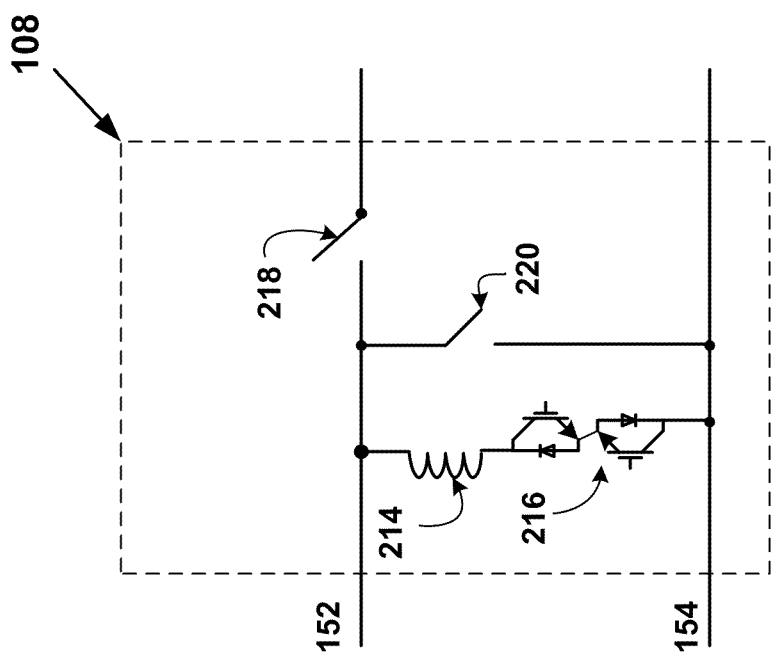
FIG. 17 shows a schematic circuit of a first protection device that may be used in the first and second PEMs.

Referring now to FIGS. 17 and 18, the protection devices 108, 109 each include a fault current limiting assembly that includes an impedance 214 and an electronic switch 216. The protection device 108 further includes two switches 218, 220 switches, whereas the protection device 110 further includes three switches 218, 220, 222. Each of the switches 218-222 may be a mechanical switch, an electronic switch or a hybrid mechanical/electronic switch. The switches 218-222 and the electronic switch 216 are controlled by the control device 114.

The protection device 108 operates such that during normal operation of the PEM 30 in the hybrid transformers 10-20, 76, 90, the switch 218 is closed and the switch 220 is open. If the PEM 30 malfunctions, a bypass can be created by opening the switch 218 and closing the switch 220. During normal power network operation, the electronic switch 216 is open and current flows through the PEM 30. During a network phase-to-ground or phase-to-phase fault, the switch 218 is opened (while the switch 220 remains open) and the electronic switch 216 is closed, thereby forcing the fault current to pass through the impedance 214. By introducing the impedance 214 during faults, the fault current is limited to protect the transformer and upstream equipment. Impedance 214 can be of a resistive or an inductive type.

The operation of the protection device 110 is similar to the operation of the protection device 108. During normal operation of the PEM 31 in the hybrid transformers 66, 68, the switches 218, 222 are closed and the switch 220 is open. If the PEM 31 malfunctions, a bypass can be created by opening the switches 218, 222 and closing the switch 220. During normal power network operation, the electronic switch 216 is open and current flows through the PEM 31. During a network phase-to-ground or phase-to-phase fault, the switches 218, 222 are opened and the electronic switch 216 is closed, thereby forcing the fault current to pass through the impedance 214. By introducing the impedance 214 during faults, the fault current is limited to protect the transformer and upstream equipment. Impedance 214 can be of a resistive or an inductive type.

In addition to, or in lieu of, a protection device (108 or 109), the control device 114 of each hybrid transformer (10-20, 66, 68, 76 or 90) may control the switching devices of the VSC (112, 140, 158 or 174) to protect against short circuit faults. The control device 114 does so by monitoring the input voltage and the output current of the hybrid transformer. If the output current exceeds a predetermined limit, thereby indicating a short circuit fault in the output, or the input voltage drops below a certain level, thereby indicating a short circuit fault in the input, the control device 114 stops the pulse width modulation of all of the switching devices, i.e., turns off (opens) the switching devices.

In the hybrid transformers 12, 16, 20, 68 it is possible that the VSC (112, 140, 158 or 174) may be subject to high voltage in the event of a short circuit fault. The control device 114 monitors the voltage across the VSC. If the VSC (140, 158 or 174) is used and the voltage increases above a predetermined level, thereby indicating a fault, the control device 114 turns on (closes) the top two switching devices (or the bottom two switching devices) in the first and second switching bridges (while the other two switching devices are turned off), thereby causing the VSC to be bypassed.

Figure 19:
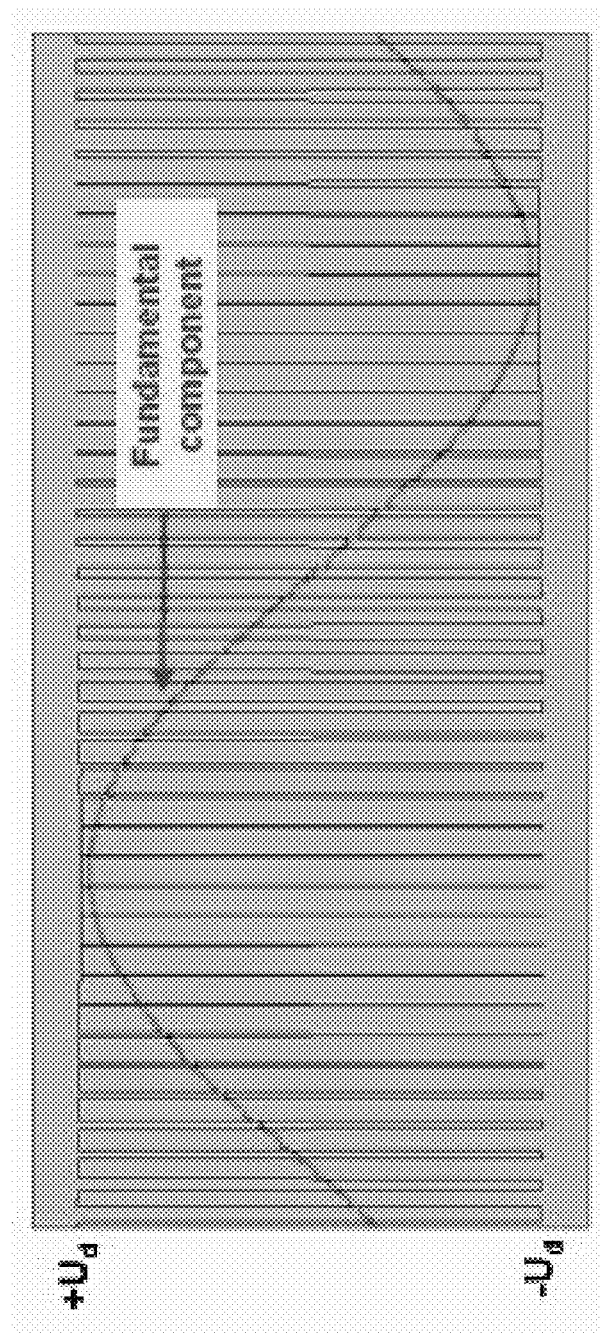
FIG. 19 shows a schematic of a sinusoidal waveform formed by pulse width modulation.

In each PEM (30 or 31), the control device 114 includes a processor for executing a program stored in associated memory that controls the VSC (112, 140, 158 or 174) using pulse width modulation (PWM), wherein the switching devices (122, 148 or 186) are opened and closed to create a series of voltage pulses, wherein the average voltage is the peak voltage times the duty cycle, i.e., the "on" and "off" times of pulses. In this manner, a sine wave can be approximated using a series of variable-width positive and negative voltage pulses as shown in FIG. 19. The phase and the amplitude of the sine wave can be changed by changing the PWM pattern.

In each PEM (30 or 31), the control device 114 controls the switching bridge(s) to balance the real power transferring from the VSC (112, 140, 158 or 174) and to improve the primary side power factor by providing reactive power to the load through the transformer coupling. In addition, in each VSC (112, 140, 158 or 174), the control device 114 maintains the output voltage of the hybrid transformer at a set value or reference output voltage (such as 240V RMS) and to be a clean sinusoidal waveform. Thus, in the event of a voltage sag, the control device 114 increases the voltage output of the VSC (112, 140, 158 or 174) and in the event of a voltage swell, the control device 114 decreases the voltage output of the VSC (112, 140, 158 or 174).

Figure 20:
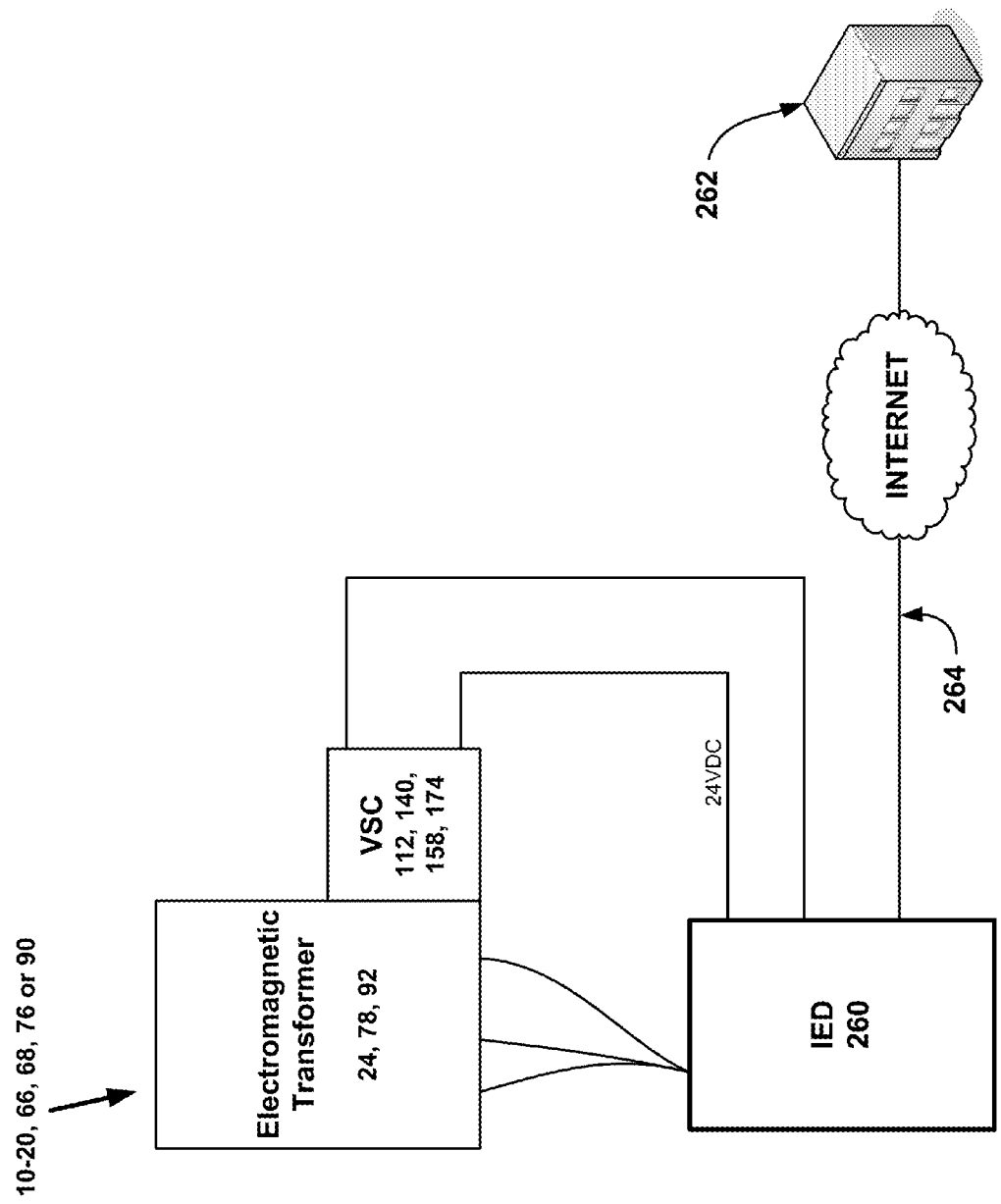
FIG. 20 shows a schematic circuit of a hybrid transformer with an IED and a communication link.

In each of the hybrid transformers 10-20, 66, 68, 76, 90, the control device 114 may be an intelligent electronic device (IED) or may interface with an IED, wherein the IED controls and monitors operational aspects of the hybrid transformer in addition to the VSC (112, 140, 158 or 174). Such an IED 260 is shown in FIG. 20 mounted on or proximate to the hybrid transformer (10-20, 66, 68, 76 or 90). The IED 260 includes a user interface, a processor, memory and a communication port. In addition to controlling the VSC (112, 140, 158 or 174) and the devices appurtenant thereto, the IED 260 monitors the operation of the hybrid transformer and communicates operating information to a remotely located control center 262 over a communication link 264, which may be may be a physical hardwired link, a satellite link, a cellular link, a modem or telephone line link, an Internet link or any other wireless or wide area or shared local area network link. For example, the currents, voltages and temperatures of the primary and/or secondary windings may be measured by sensors that are connected for communication with the IED 260. The IED 260 may periodically or continuously transmit values for these currents, voltages and temperatures over the communication link 264 to the control center 262 and/or may transmit alarms to the control center 262 over the communication link 264 if the values exceed certain predetermined limits. In addition to transmitting information about the primary and/or secondary windings, the IED 260 may transmit information about the operation of the VSC (112, 140, 158 or 174) to the control center 262 over the communication link 264. Moreover, the IED 260 may receive and implement control commands from the control center 262 for changing the operation of the VSC.

In addition to communicating with the control center 262, the IED 260 may communicate with other IEDs. For example, the IED 260 may communicate with other IEDs 260 installed in other hybrid transformers (10-20, 66, 68, 76 or 90) that are part of the same power distribution network. The IEDs 260 may communicate directly with each other or through a data server (not shown) located in the control center 262. In the former case, the IEDs 260 may communicate directly with each other via radio frequency transceivers, a wired or wireless local area network (LAN) or a communication bus. In the latter case, communication between each IED 260 and the data server occurs over the communication link 264.

The IED 260 may support the IEC61850 standard and, in so doing, define abstract object models for electrical substations and a method for accessing these models over a network. The models can be mapped to a number of protocols, including Manufacturing Message Specification (MMS), Generic Object Oriented Substation Events (GOOSE), Generic Substation Status Event (GSSE), and Sampled Measured Values (SMV). These protocols can run over TCP/IP networks and/or LANs using high speed switched Ethernet.

Instead of using an IED to transmit operating information to a remotely located control center, transmitters may be used to do so. The transmitters may be connected to the sensors and may transmit the values measured by the sensors to a remote location, such as the control center 262, via a communication link, which may be wireless, or hardwired.

In each of the hybrid transformers (10-20, 66, 68, 76 or 90), the DC bus (120, 146, 162 or 184) may be connected to provide DC power to the sensors, transmitters and other communication devices that are used to monitor and transmit data concerning the operation of the hybrid transformer. The DC bus (120, 146, 162 or 184) may also be connected to provide DC power to the control device 114 and/or IED 260. Depending on the application of the hybrid transformer, the DC bus may be connected to provide DC power to equipment associated with the application.

Figure 21:
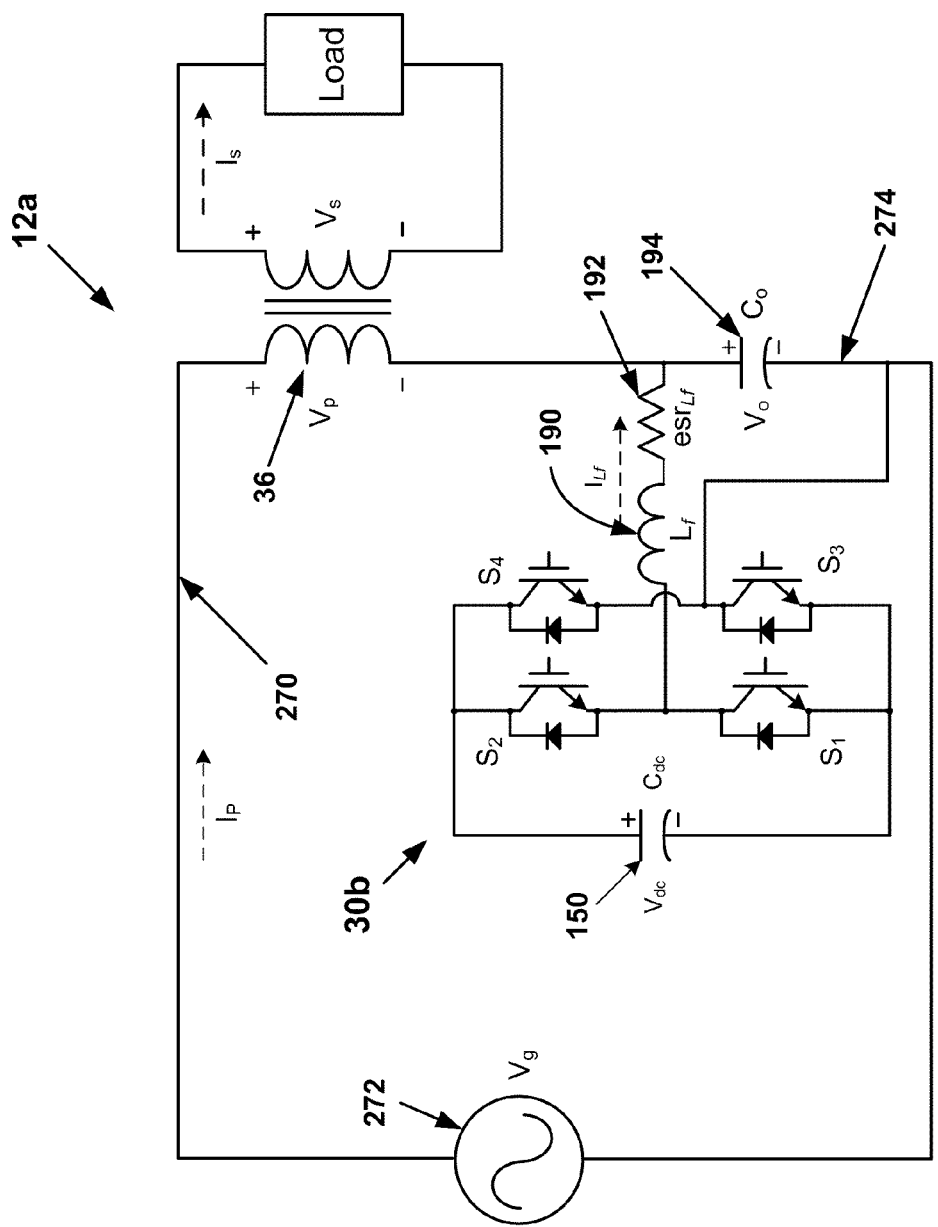
FIG. 21 shows a more detailed schematic circuit of a version of the second hybrid transformer.
Figure 22:
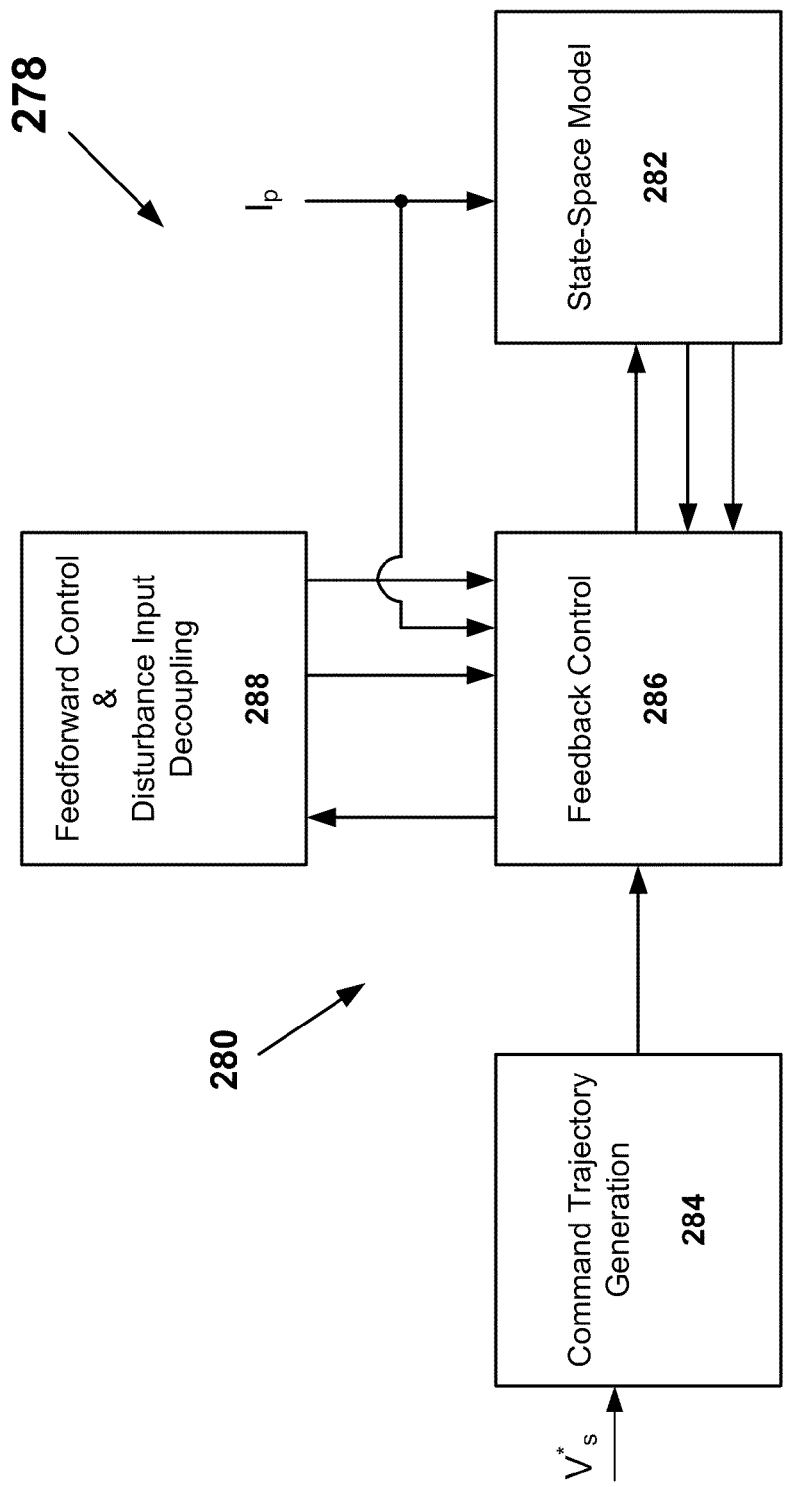
FIG. 22 shows a block diagram of a control scheme for a voltage source inverter.

Referring now to FIG. 21, there is shown a more detailed view of an embodiment of the hybrid transformer 12 (further designated by the letter "a") containing electrical property labeling that will be used below to describe the control and operation of the hybrid transformer 12a. A positive end of the primary winding 36 is connected by a line 270 to a voltage source 272 (providing a voltage $V_g$), while a negative end of the primary winding 36 is connected by a line 274 to the voltage source 272. In the embodiment shown in FIG. 21, the hybrid transformer 12a utilizes the VSC 30b and is connected into the primary winding structure by the low pass filter 110. The switching devices 148 are designated by reference descriptors $S_1$ to $S_4$.

The VSC 30b in the hybrid transformer 12a may be controlled by the control device 114 using a control scheme 278 shown in FIGS. 22-26. The control scheme 278 includes a controller 280 and a state-space model ("model") 282 of the VSC 30b.

Figure 23:
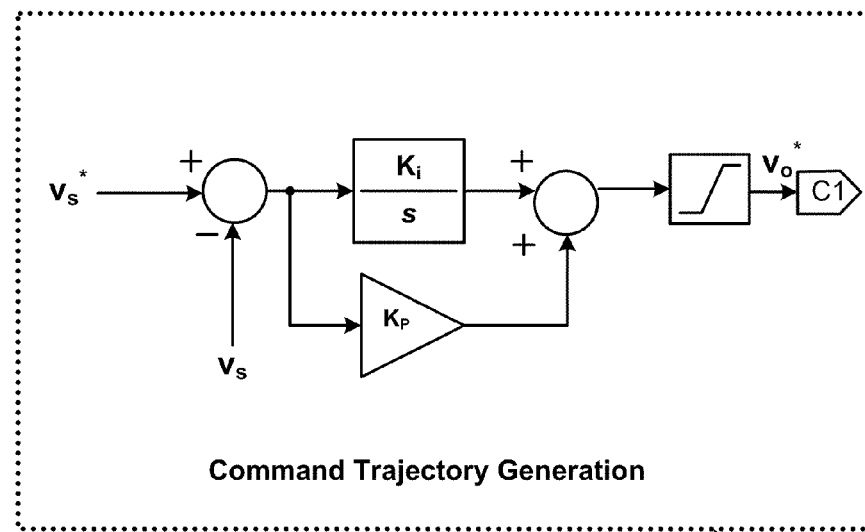
FIG. 23 shows a functional block diagram of a command trajectory generation algorithm of the control scheme.
Figure 24:
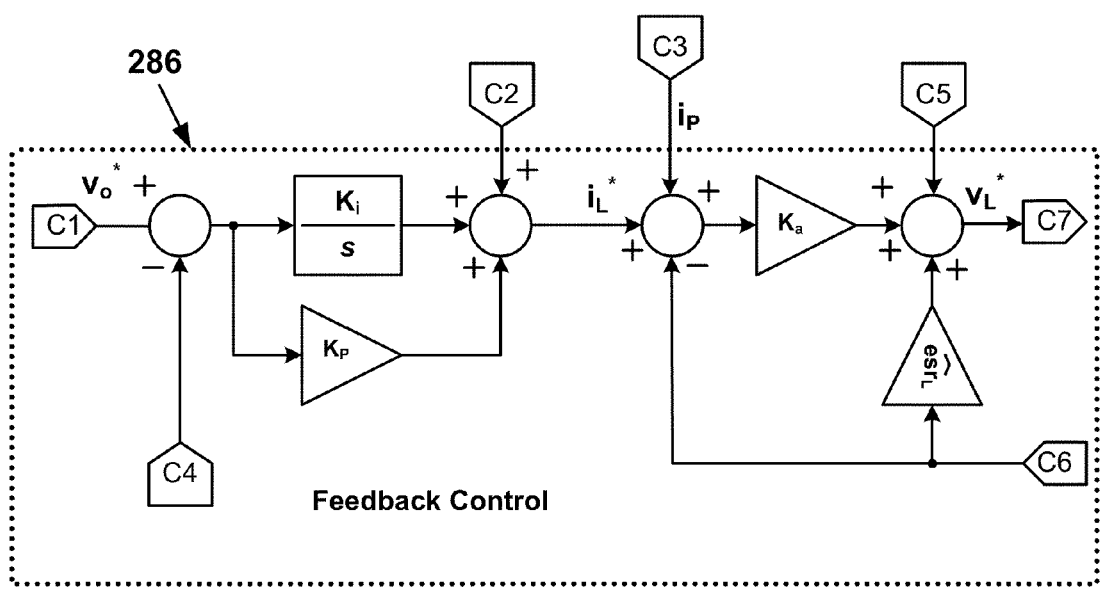
FIG. 24 shows a functional block diagram of a feedback control algorithm of the control scheme.
Figure 25:
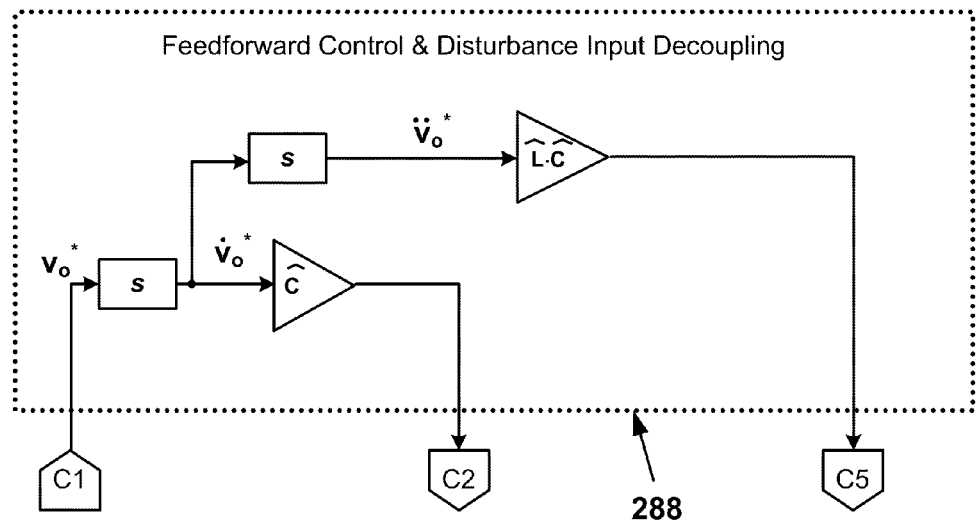
FIG. 25 shows a feedforward control & disturbance input decoupling algorithm of the control scheme.
Figure 26:
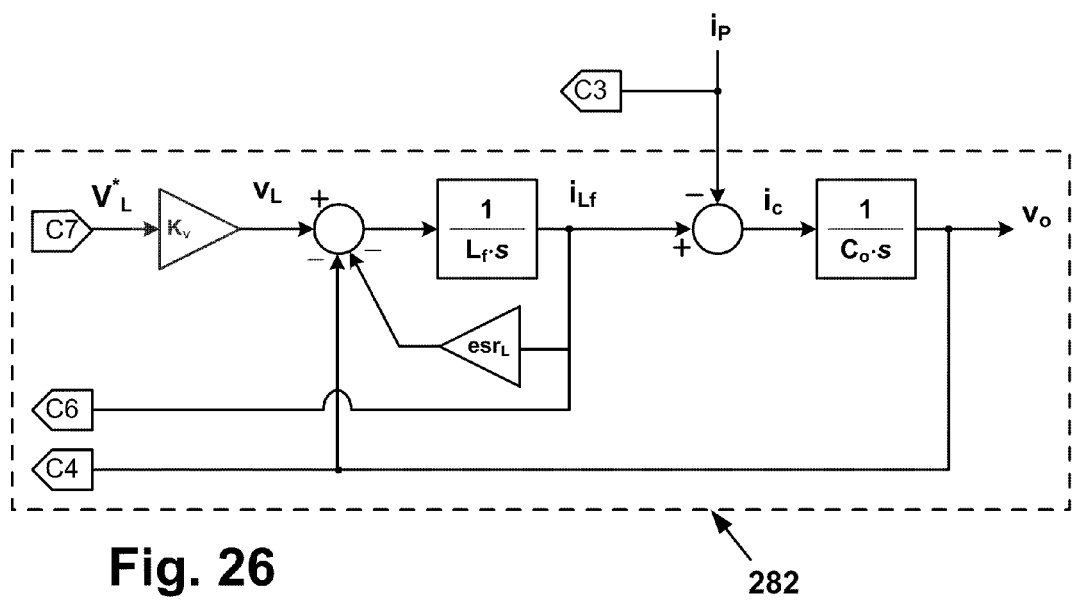
FIG. 26 shows a state-space model of the control scheme.

The controller 280 includes a command trajectory generation ("trajectory") algorithm 284, a feedback control ("feedback") algorithm 286 and a feedforward control & disturbance input decoupling (feedforward/decoupling) algorithm 288. The command trajectory of $V_o^*$ is generated as follows:

$$V_{s\_error} = V_s^* - V_s$$

$$V_{o\_preclamp} = (K_p 1/s) \times V_{s\_}$$

$$V_o^* = f_{sat}(V_{o\_preclamp})$$

where $V_{o\_preclamp}$ is the voltage at the input of the saturation block in FIG. 23

For PWM, each of the first and second switching bridges 142, 144 of the VSC 30b inverter is controlled separately by comparing $V_{tri}$ with $+V_{ref}$ and $-V_{ref}$. The resulting waveforms are used to control the switching devices 148 as follows:

| | |
|---|---|
| if $+V_{ref} > V_{tri}$ | $S_1$ on, $S_2$ off |
| else, | $S_1$ off, $S_2$ on |
| if $-V_{ref} > V_{tri}$ | $S_3$ on, $S_4$ off |
| else, | $S_3$ off, $S_4$ on | where:
Vref is the voltage reference.
Vtri is the voltage of the triangular waveform used in the generation of the PWM signal.

The controller 280 is a cascaded controller with an inner inductor current loop and an outer output voltage loop. The controller 280 uses state feedback decoupling of the equivalent series resistance (ESR) drop of the inductor 190. Nulling the state coupling in this approach allows a simple proportional gain, $K_a$, to be used in forming the inductor current loop.

Figure 27:
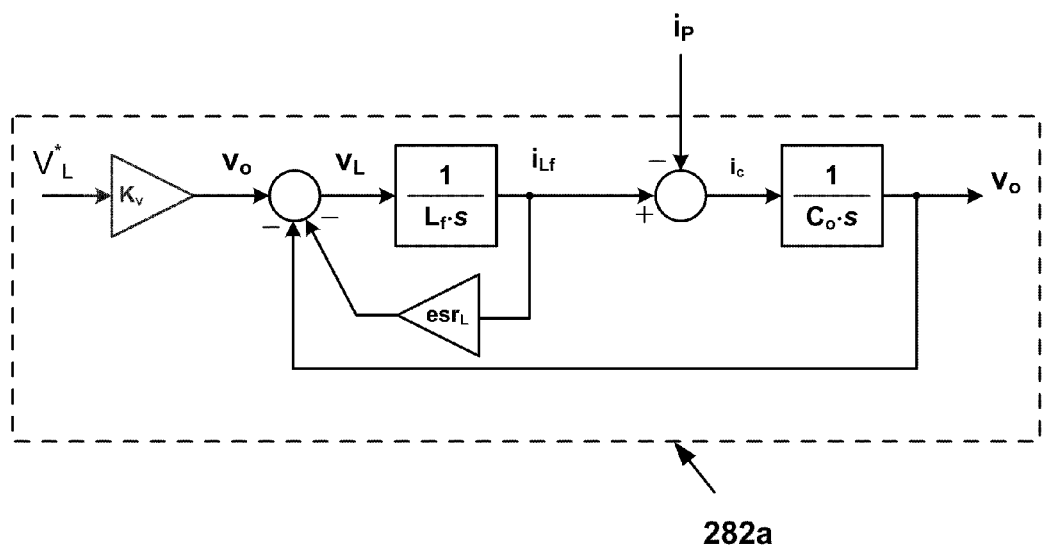
FIG. 27 shows a simplified form of the state-space model.

In FIG. 27, the model 282 (further designated by the letter "a") is shown in a simplified form. This simplification can be viewed as the input voltage decoupling. With this simplification, the open-loop transfer function of the physical system becomes:

$$\frac{V_O(s)}{V_L^*(s)} = \frac{K_v}{(L_f \cdot s + esr_L) \cdot C_o s}$$

The transfer function of the command tracking is described as follows:

$$\frac{V_O}{V_O^*} = \frac{K_p \cdot K_a s + K_i \cdot K_a}{\frac{L_f \cdot C_o}{K_v} s^3 + C_o \cdot K_a s^2 + K_p \cdot K_a s + K_i \cdot K_a}$$

At low and mid frequencies, the command tracking is always Vc/Vc*=1. At intermediate high/mid and high frequencies, the command tracking becomes Vc/Vc*=0. The closed-loop poles can be placed to the desired location by determining gains of $K_p$, $K_i$, and $K_a$.

In order to enhance the control performance of the cascaded controller format, the controller 280 additionally uses state command feedforward. At low, intermediate, and high frequencies, the command tracking is always Vc/Vc*=1. Therefore, desired AC voltage regulation is achieved with zero or nearly zero steady-state error in both magnitude and phase.

$$\frac{V_O}{V_O^*} = \frac{\frac{\hat{L}_f \cdot \hat{C}_o}{K_v} s^3 + \hat{C}_o \cdot K_a s^2 + K_p \cdot K_a s + K_i \cdot K_a}{\frac{L_f \cdot C_o}{K_v} s^3 + C_o \cdot K_a s^2 + K_p \cdot K_a s + K_i \cdot K_a}$$

A simulation of the hybrid transformer 12a with the controller 280 was performed using Matlab Simulink. Control performance was investigated under the following simulation conditions:

$V_g$=14400 V&60 Hz,$N_p/N_s$=120,Load=1+j·1.885Ω
(5.2+j·9.82 p.u)@60 Hz $C_{dc}$=6000 µF,$L_f$=200 µH,$esr_{Lf}$=50 mΩ,$C_o$=40 µF switching device 104 (IGBT) characteristics:
$V_f$=2V (IGBT voltage drop),
$T_f$=1 µs (IGBT fall time), $T_t$=2 µs (IGBT tail time),
$V_d$=1 V (Diode voltage drop)
$f_{pwm}$=10 kHz (Converter switching frequency)
Assumption:
1) $C_{dc}$ is pre-charged at 30% of $V_g$.
2) Only the magnitude of transformer secondary voltage is regulated.

Figure 28:
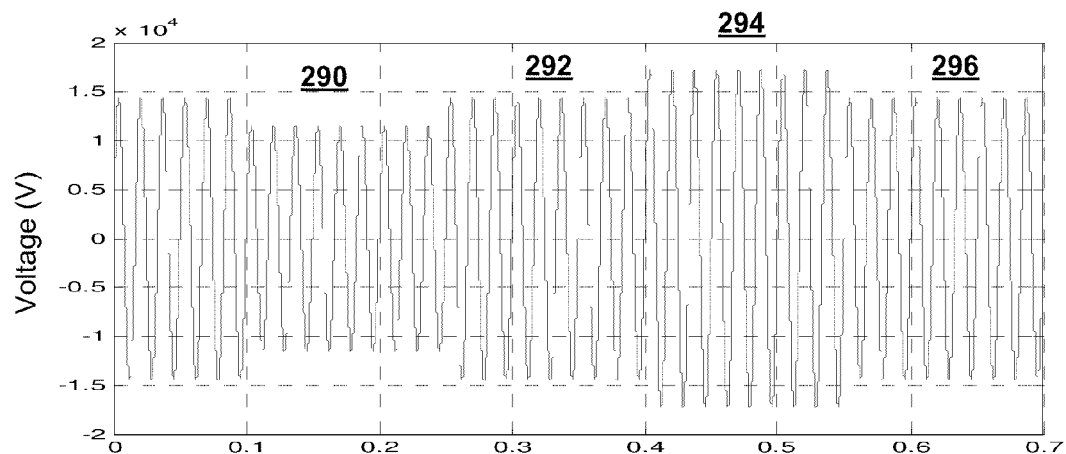
FIG. 28 shows a plot of the input voltage of the simulated second hybrid transformer.
Figure 29:
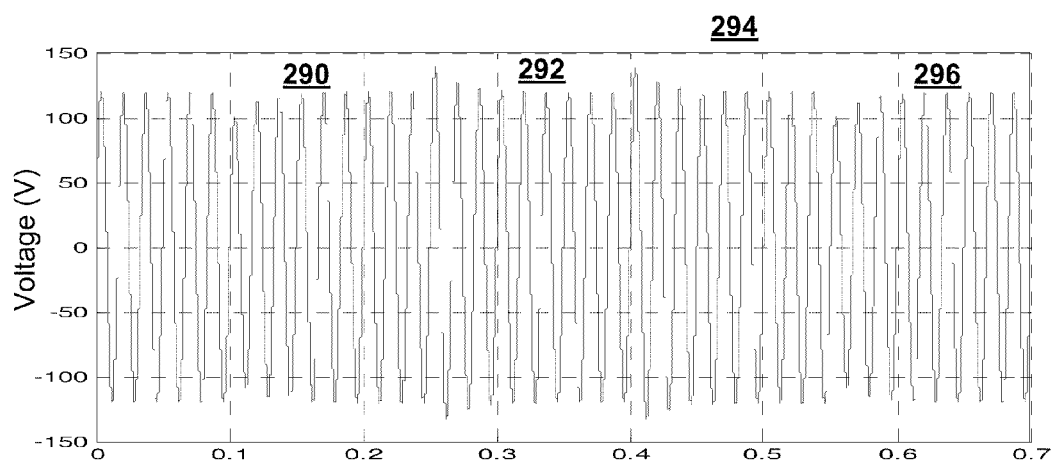
FIG. 29 shows a plot of the output (secondary) voltage of the simulated second hybrid transformer.
Figure 30:
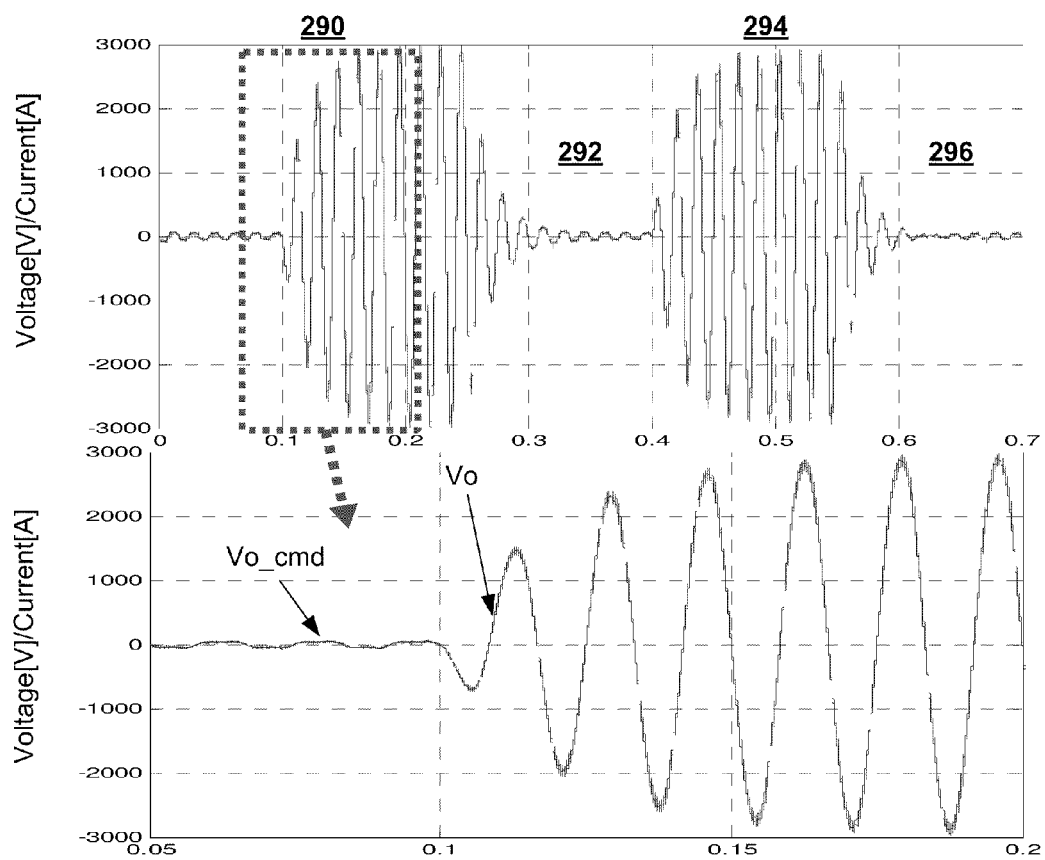
FIG. 30 shows the regulation performance of the output voltage of a voltage source converter of the simulated second hybrid transformer.

As shown in FIG. 28, in a transient period 290, a twenty percent (20%) sag is first introduced in the input voltage $V_g$. In a transient period 292, the input voltage $V_g$ is then allowed to return to its normal value. Thereafter, in a transient period 294, a twenty percent (20%) swell is introduced in the input voltage $V_g$. The input voltage $V_g$ is again allowed to recover in a transient period 296. The results of these changes on the secondary voltage $V_s$ are shown in FIG. 29. For all of the transient periods, the hybrid transformer 12a shows very good magnitude regulation performance. FIG. 30 shows the regulation performance of the output voltage of the VSC 30b. Using the controller 280, very good AC voltage regulation is achieved. Ideally, the DC bus voltage (not shown) of the VSC 30b should keep constant, since the VSC 30b provides only reactive power. However, in simulation, the switching devices 148 (IGBT) generate switching and conduction losses. Loss also happens at the filter inductor 190 due to ESR of the filter inductor 190. Thus, in sum, a voltage droop in the DC bus voltage occurs due to a combination of switching losses, conduction losses, and losses from ESR of the filter inductor 190.

Figure 31:
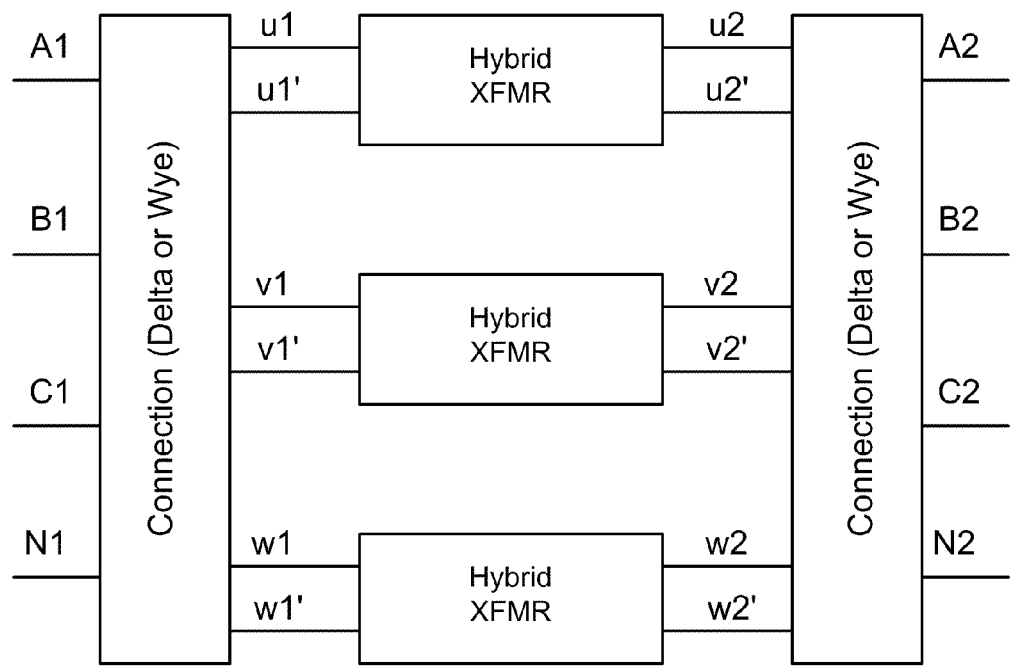
FIG. 31 shows a schematic of a three-phase hybrid transformer formed from three single-phase hybrid transformers.

For each of the single-phase hybrid transformers 10-20, 66, 68, 76, 90, three of the hybrid transformers can be combined to form a three-phase hybrid transformer. A schematic of the connection is shown in FIG. 31. The primary windings can be connected together in either a Delta configuration or a Wye configuration, and the secondary windings can be connected together in either a Delta or a Wye configuration. With the three single phase hybrid transformers connected together, no change is required to the control strategy. Each hybrid transformer operates independent of the other two transformers. In FIG. 31, for both Delta and Wye configurations, u1 is connected to phase A (source), v1 is connected to phase B (source) and w1 is connected to phase C (source) and u2, v2 and w2 are correspondingly connected on the load side. In the Delta configuration, u1' is connected to phase B (source), v1' is connected to phase C (source) and w1' is connected to phase A (source) and u2', v2' and w2' are correspondingly connected on the load side. In the Wye configuration, u1', v1' and w1' are connected to neutral, N (source) and u2', v2' and w2' are correspondingly connected on the load side.

In lieu of having three separate PEMs (and VSCs) for a three phase hybrid transformer, a single integrated PEM (and VSC) may be provided for a three phase hybrid transformer. A three phase version of each of the single phase hybrid transformers 10-20, 66, 68, 76, 90 may be provided with a single integrated PEM (and VSC). Examples of this are shown in FIGS. 32-38.

Figure 32:
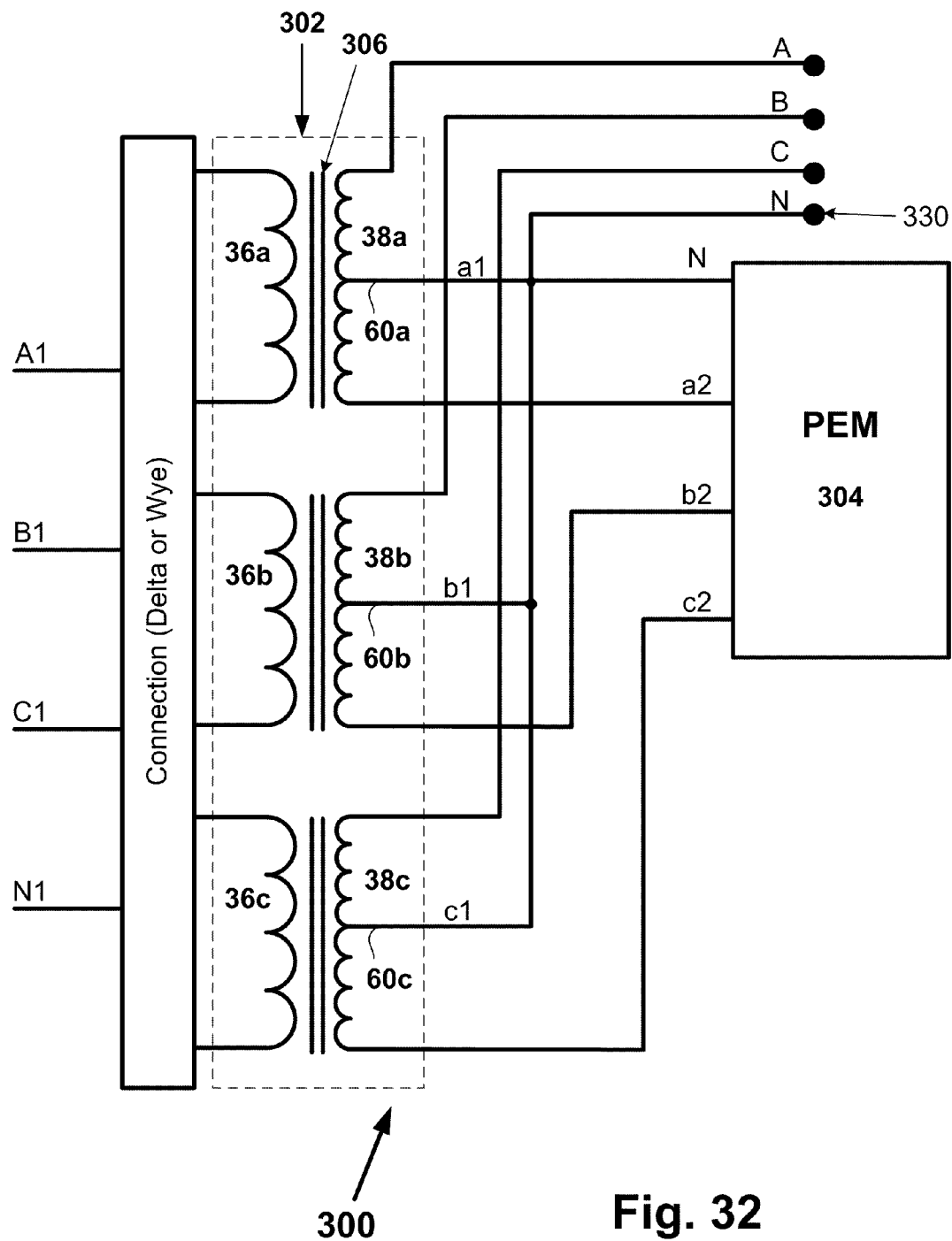
FIG. 32 shows a schematic circuit of a first three-phase hybrid transformer.
Figure 33:
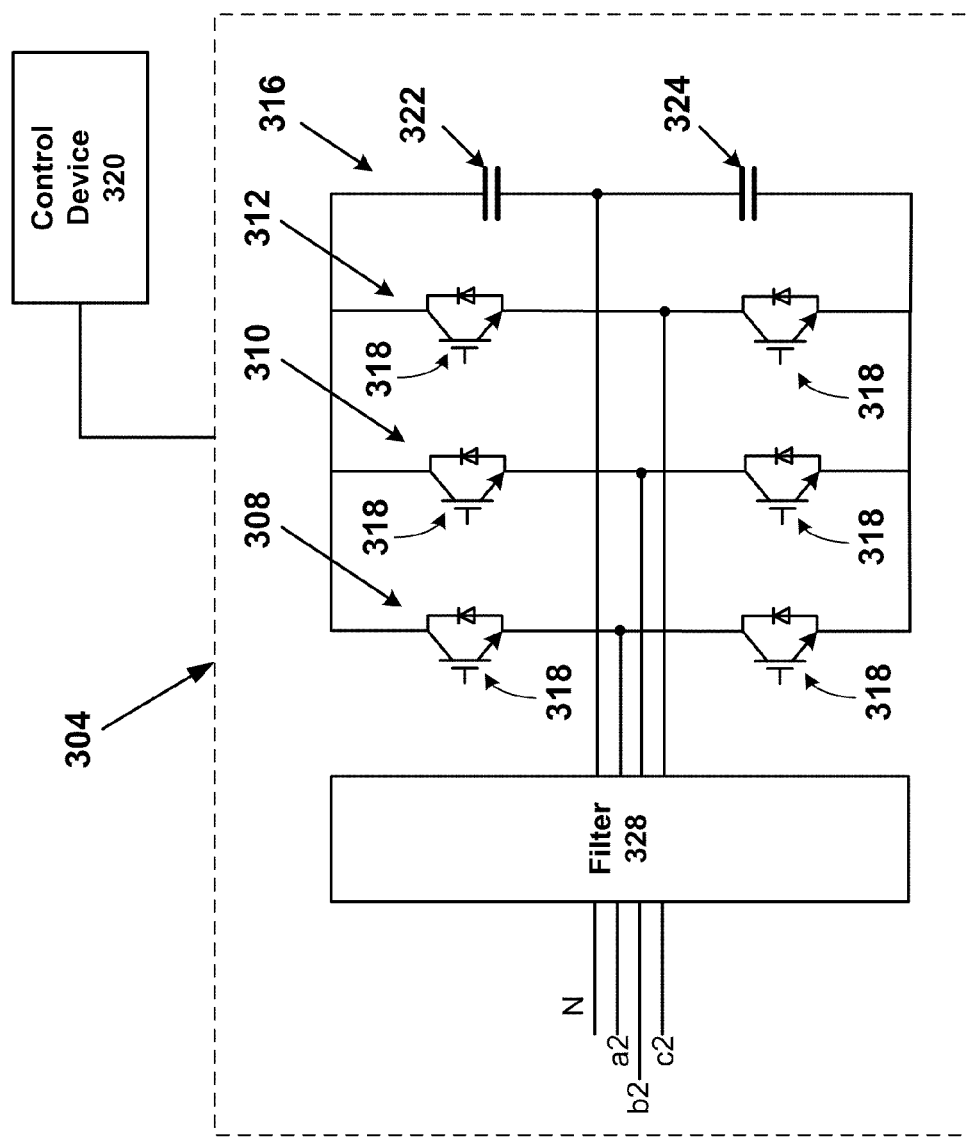
FIG. 33 shows a schematic circuit of a voltage source converter of the first three-phase hybrid transformer shown in FIG. 32.

Referring now to FIG. 32, there is shown a three-phase hybrid transformer 300 that includes a three-phase electromagnetic transformer 302 and a PEM 304. The hybrid transformer 300 is substantially a three phase version of the hybrid transformer 18 with a single integrated PEM (and VSC). The electromagnetic transformer 302 includes three primary windings 36a,b,c and three secondary windings 38a,b,c mounted to a ferromagnetic core 306. The PEM 304 is shown in FIG. 33 and includes a VSC with three switching legs 308, 310, 312 connected in parallel to a DC bus 316. Each of the switching legs 308-312 includes a pair of switching devices 318 connected in series. A control device 320 controls the operation of the switching devices 318. Each switching device 318 may be an insulated gate bipolar transistor (IGBT) and an anti-parallel diode. Other components and configurations, however, may be used for each switching device 318. For example, a combination of parallel-connected switches (IGBT or otherwise) and diodes may be used for each switching device 318. The DC bus 316 includes capacitors 322, 324. DC voltage from the DC bus 316 is converted to sinusoidal AC voltages of different phases by the switching legs 308-312. A filter 328 is connected between the secondary windings 38 on one side and the switching legs 308-312 and the DC bus 316 on the other side. Inner taps 60a,b,c are connected by lines a1, b1, c1, respectively, to the neutral line N, which is connected to an output bushing 330 and to the DC bus 316 of the PEM 304, between the capacitors 322, 324. In this manner, the secondary windings 38 are connected in a Wye configuration. Ends (or outer taps) of the secondary windings 38 are connected by lines a2, b2, c2, respectively, through the filter 328 to nodes of the switching legs 308-312, wherein each node is located between the switching devices 318. The filter 328 helps prevent high frequency harmonics from being introduced into the output voltages of the transformer 300 and the currents in the primary and secondary windings 36, 38 as a result of the switching of the switching devices 318. The filter 328 comprises inductors and optionally capacitors arranged in a manner similar to that in the filter 160.

Although not shown, the PEM 304 may include a protection device having a construction similar to the protection device 109 except adapted for a three phase application. It should also be appreciated that the PEM 304 could have a fourth switching leg and the neutral line could be connected to the fourth switching leg, between switching devices.

Figure 44:
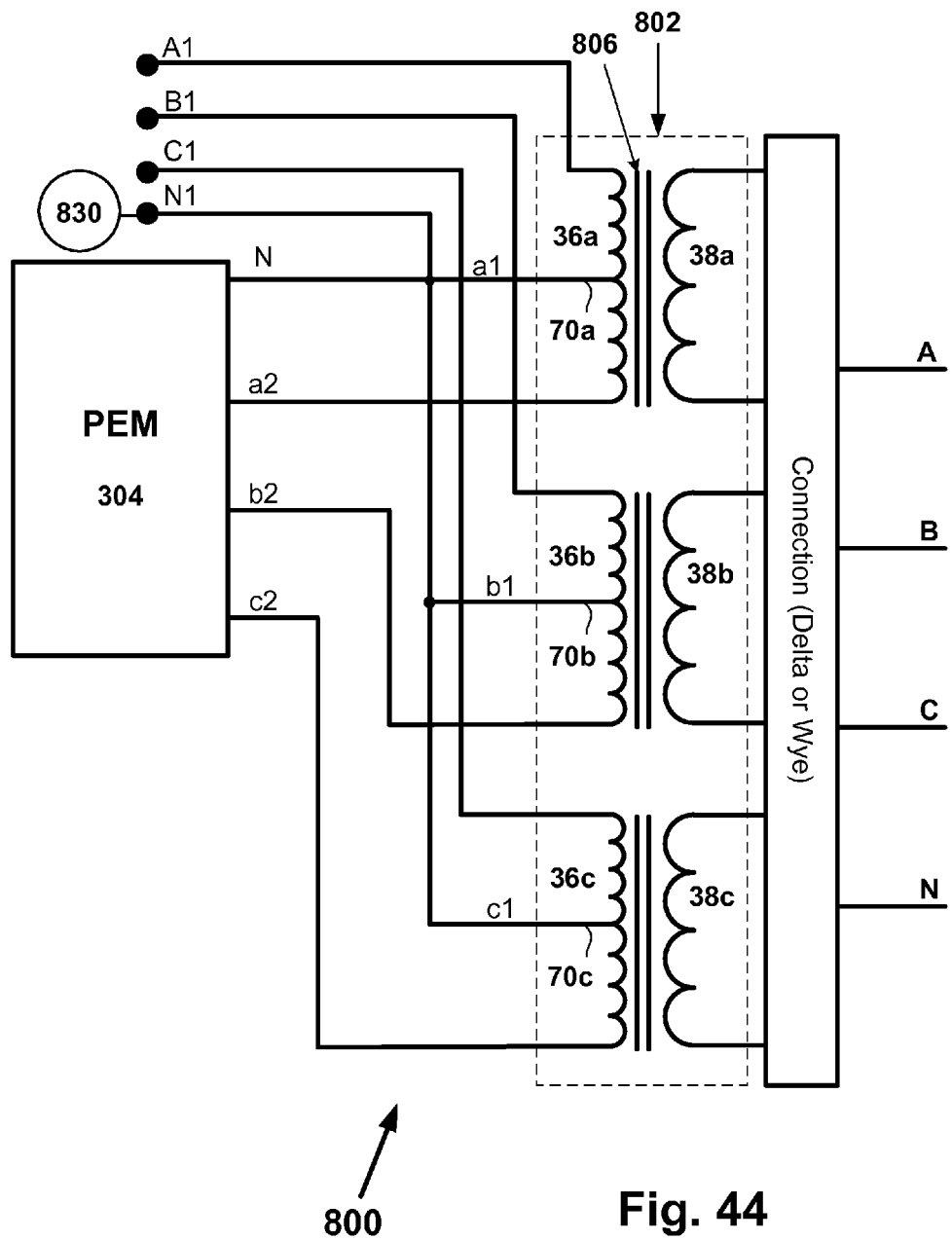
FIG. 44 shows a schematic circuit of a sixth three-phase hybrid transformer.

A three-phase hybrid transformer 800 may be provided having the same construction as the three-phase hybrid transformer 300, except the PEM 304 is connected to the primary windings and taps therein. Such a transformer is substantially a three phase version of the hybrid transformer 20 with a single integrated PEM (and VSC). The hybrid transformer 800 is shown in FIG. 44 and includes a three-phase electromagnetic transformer 802 and the PEM 304. The electromagnetic transformer 802 includes three primary windings 36a,b,c and three secondary windings 38a,b,c mounted to a ferromagnetic core 806. Inner taps 70a,b,c are connected by lines a1, b1, c1, respectively, to the neutral line N1, which is connected to an input bushing 830 and to the DC bus 316 of the PEM 304, between the capacitors 322, 324. In this manner, the primary windings 36 are connected in a Wye configuration.

Figure 34:
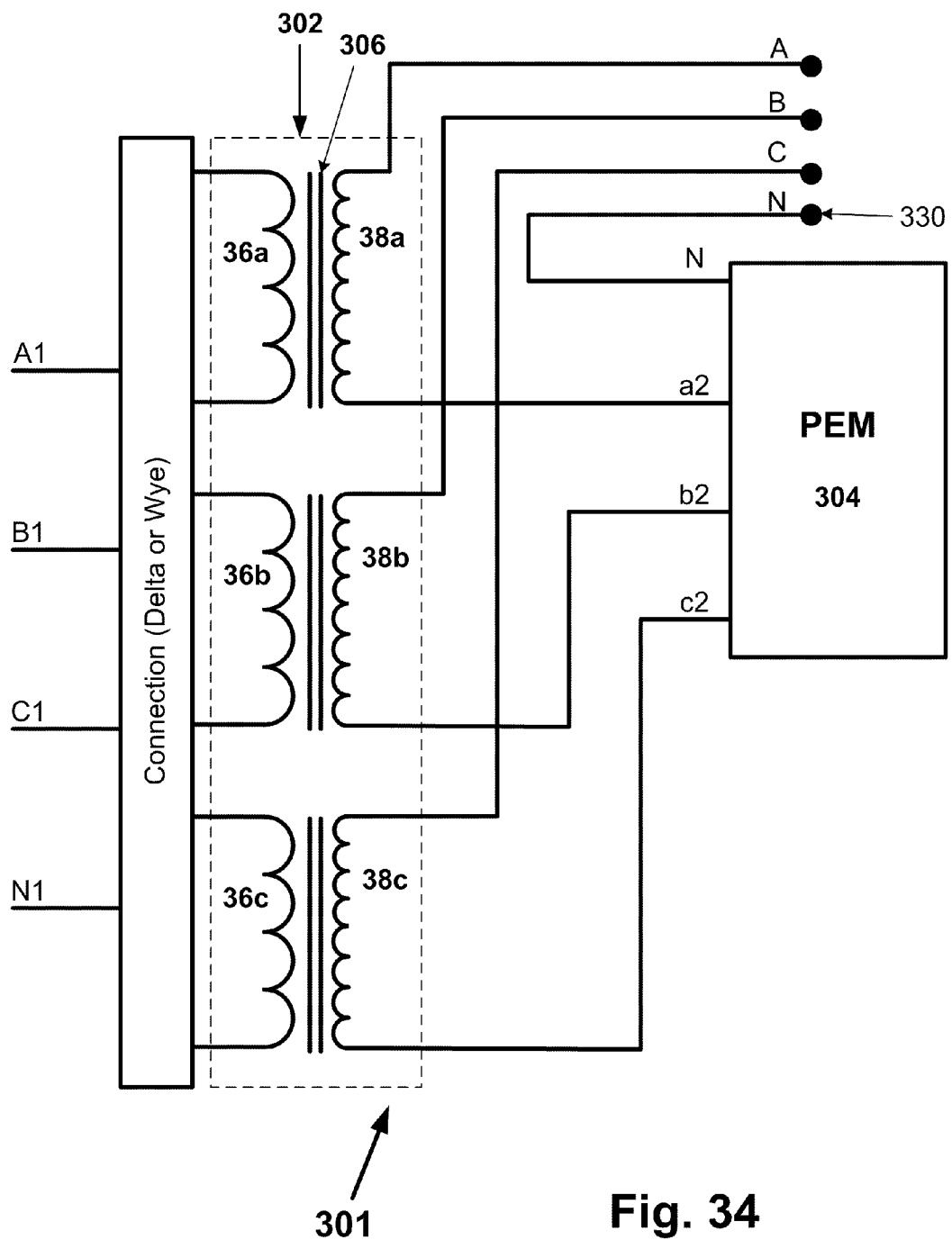
FIG. 34 shows a schematic circuit of a second three-phase hybrid transformer.

Referring now to FIG. 34, there is shown a three-phase hybrid transformer 301 that has substantially the same construction as the hybrid transformer 300, except the hybrid transformer 301 does not have any taps connected to the PEM 304. The hybrid transformer 301 is substantially a three phase version of the hybrid transformer 10 with a single integrated PEM (and VSC).

Although not shown a three-phase hybrid transformer may be provided having the same construction as the three-phase hybrid transformer 301, except the PEM 304 is connected to the primary windings therein. Such a transformer is substantially a three phase version of the hybrid transformer 12 with a single integrated PEM (and VSC).

Figure 35:
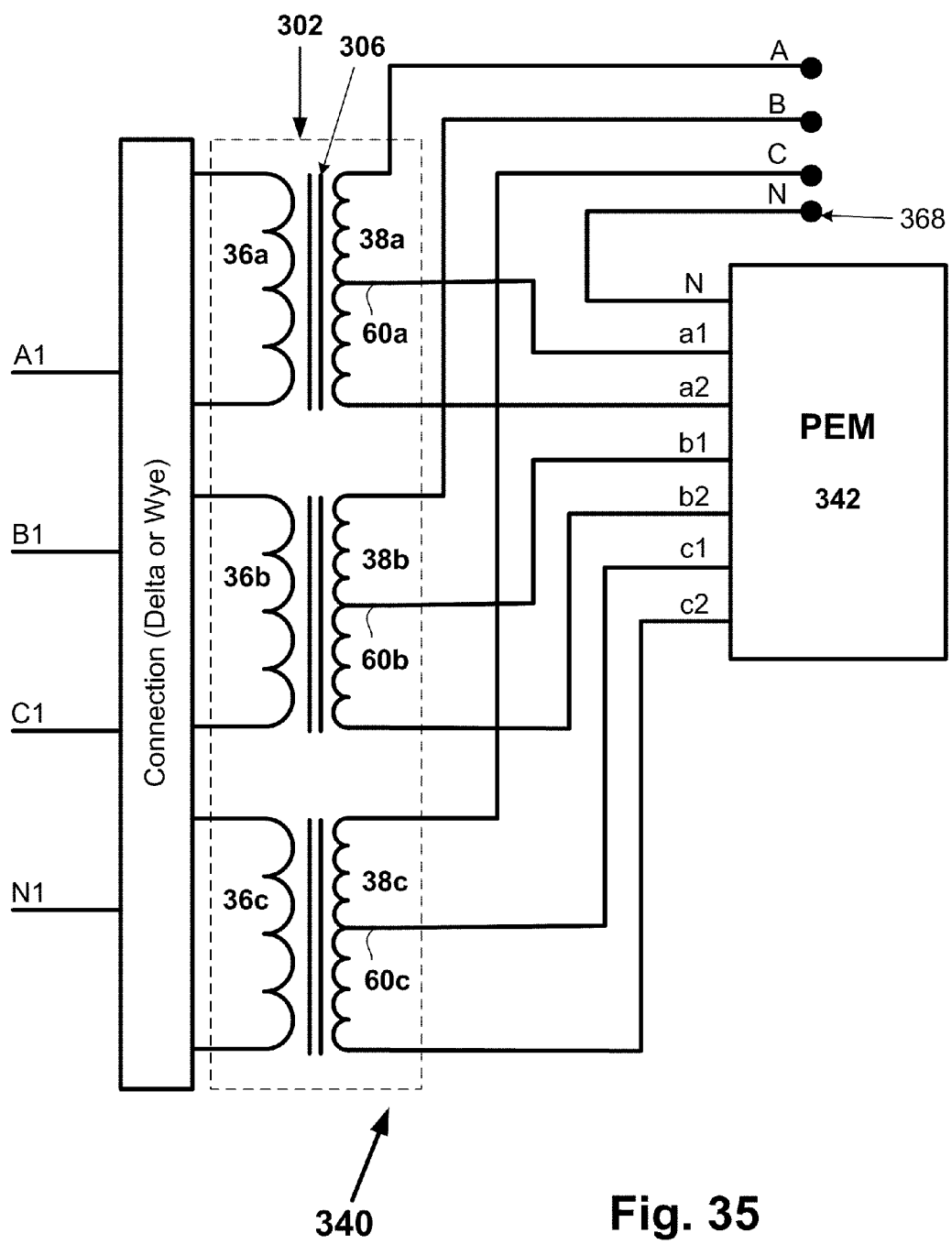
FIG. 35 shows a schematic circuit of a third three-phase hybrid transformer.
Figure 36:
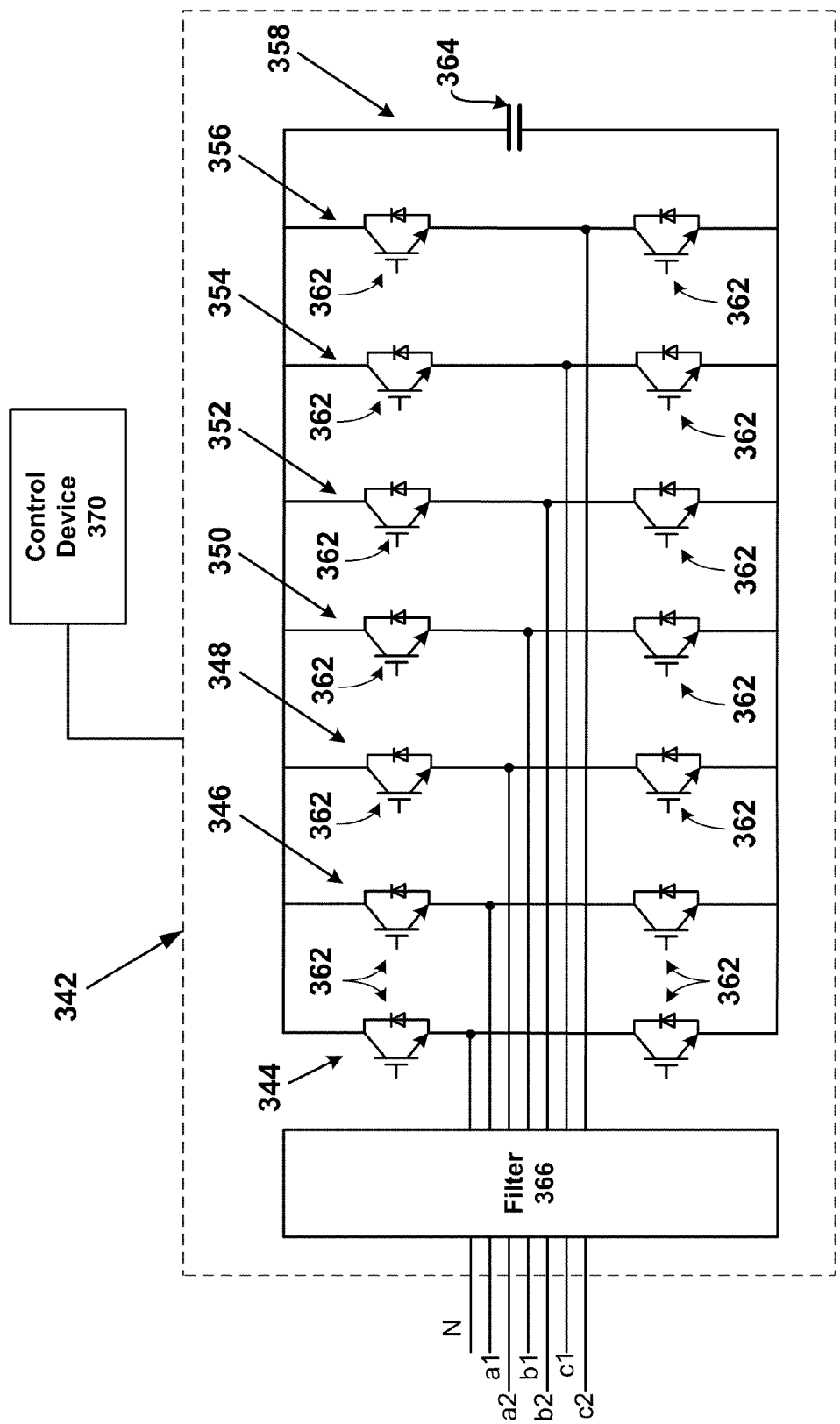
FIG. 36 shows a schematic circuit of a voltage source converter of the third three-phase hybrid transformer shown in FIG. 35.

Referring now to FIG. 35, there is shown a three-phase hybrid transformer 340 that includes a three-phase electromagnetic transformer 302 and a PEM 342. The hybrid transformer 340 is substantially a three phase version of the hybrid transformer 66 with a single integrated PEM (and VSC). The electromagnetic transformer 302 includes three primary windings 36a,b,c and three secondary windings 38a,b,c mounted to a ferromagnetic core 306. The PEM 342 is shown in FIG. 36 and includes seven switching legs 344, 346, 348, 350, 352, 354, 356 connected in parallel to a DC bus 358. Each of the switching legs 344-356 includes a pair of switching devices 362 connected in series. A control device 370 controls the operation of the switching devices 362. Each switching device 362 may be an insulated gate bipolar transistor (IGBT) and an anti-parallel diode. Other components and configurations, however, may be used for each switching device 362. For example, a combination of parallel-connected switches (IGBT or otherwise) and diodes may be used for each switching device 362. The DC bus 358 includes a capacitor 364. DC voltage from the DC bus 358 is converted to sinusoidal AC voltages of different phases by the switching legs 344-356. A filter 366 is connected between the secondary windings 38 on one side and the switching legs 344-356 and the DC bus 358 on the other side. Lines a1, b1, c1 connected through the filter 366 connect the taps 60 on the secondary windings 38 to nodes of the switching legs 346, 350, 354, respectively, wherein each node is located between the switching devices 362. Lines a2, b2, c2 connected through the filter 366 connect ends of the secondary windings 38 to nodes of the switching legs 348, 352, 356, wherein each node is located between the switching devices 362. Line N connects an output bushing 368 to a node of the switching leg 344 located between the switching devices 362. The output bushing 368 is adapted for connection to a neutral of the load. The filter 366 helps prevent high frequency harmonics from being introduced into the output voltages of the transformer 340 and the currents in the primary and secondary windings 36, 38 as a result of the switching of the switching devices 362. The filter 366 comprises inductors and optionally capacitors arranged in a manner similar to that in the filter 160, but for three phases.

Although not shown, the PEM 342 may include a protection device having a construction similar to the protection device 109 except adapted for a three phase application.

The three-phase hybrid transformer 340 has the benefit of having only seven switching legs. In the three-phase versatile transformer 340, the switching legs 344-356 for the three phases share a common DC bus 358. This arrangement requires the switching legs 344-356 for the three phases to share a common neutral phase leg (line N), as shown. Line N is sized to carry a neutral current that may be greater than the individual phase currents (lines A, B, C). In addition, the switching devices 362 in the switching leg 344 should be constructed to carry the higher current. The modulation indices of the switching legs 344-356 are different, respectively, in order to maintain proper voltage differences between the phase legs. The voltage of the DC bus 358 is greater than the voltages in the DC buses (162, 184) of the single phase VSCs 158, 174 in order to account for possible imbalances.

Although not shown a three-phase hybrid transformer may be provided having the same construction as the three-phase hybrid transformer 340, except the PEM 342 is connected to the primary windings and taps therein. Such a transformer is substantially a three phase version of the hybrid transformer 68 with a single integrated PEM (and VSC).

Figure 37:
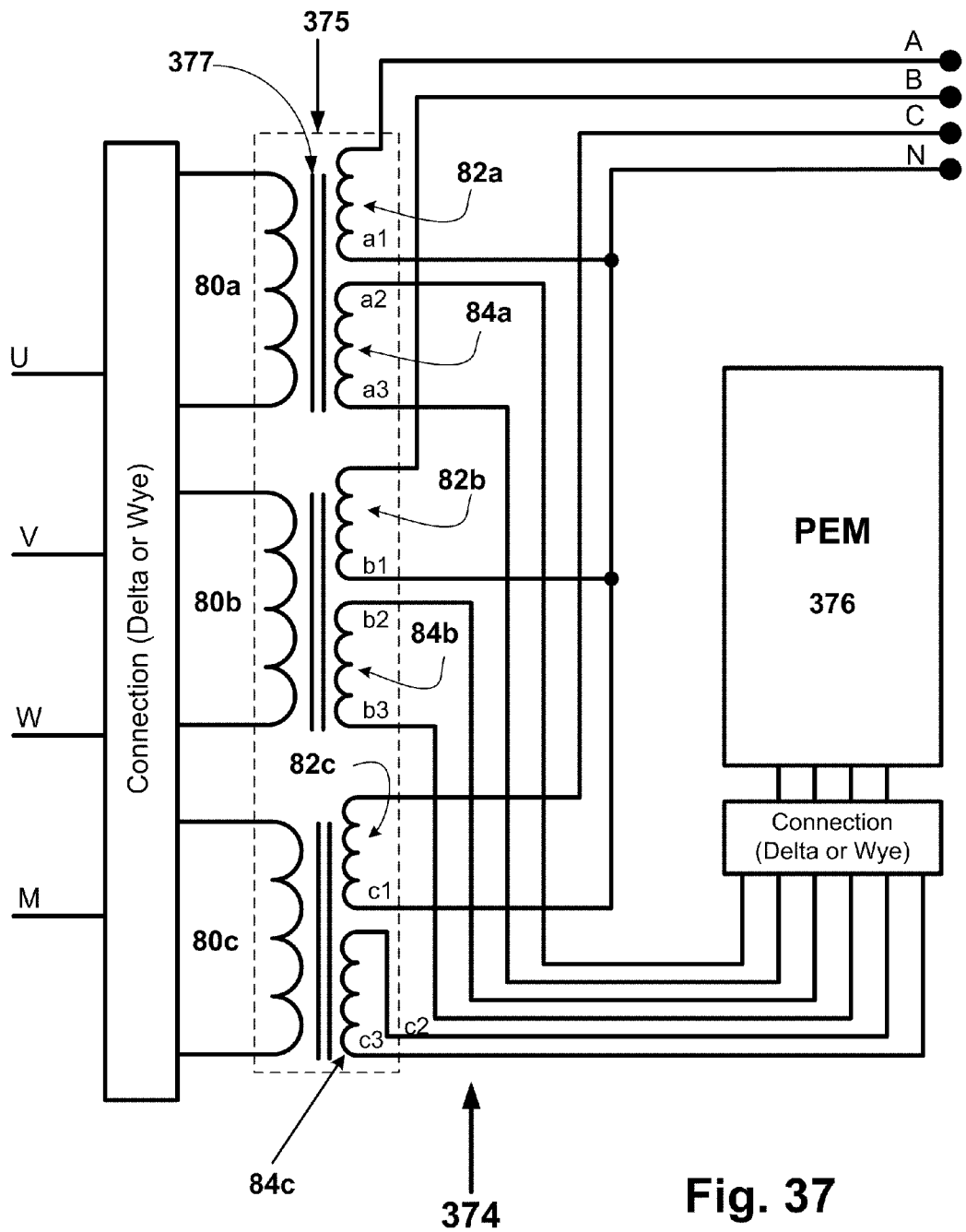
FIG. 37 shows a schematic circuit of a fourth three-phase hybrid transformer.

Referring now to FIG. 37, there is shown a three-phase hybrid transformer 374 that includes a three-phase electromagnetic transformer 375 and a PEM 376. The hybrid transformer 374 is substantially a three phase version of the hybrid transformer 76 with a single integrated PEM (and VSC). The electromagnetic transformer 375 includes three primary windings 80a,b,c, three main secondary windings 82a,b,c and three auxiliary secondary windings 84a,b,c mounted to a ferromagnetic core 377. For ease of illustration, the main secondary windings 82a,b,c are shown connected in a Wye configuration. It should be appreciated, however, that the main secondary windings 82a,b,c may alternately be connected in a Delta configuration. The auxiliary secondary windings 84a,b,c may be connected in either a Wye or a Delta configuration, as indicated.

Figure 38:
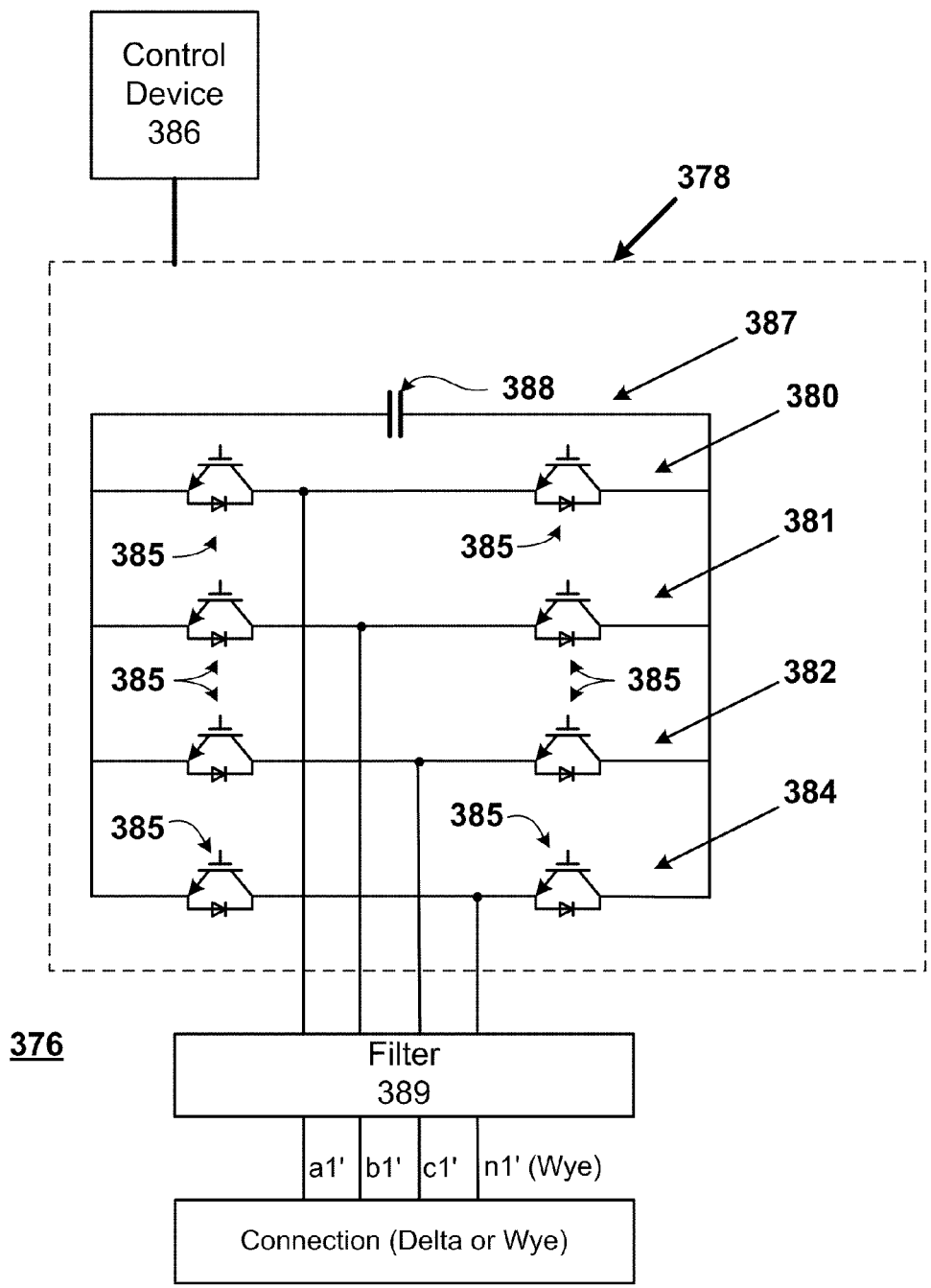
FIG. 38 shows a schematic circuit of a voltage source converter of the fourth three-phase hybrid transformer shown in FIG. 37.

The PEM 376 is shown in FIG. 38 and includes a VSC 378 connected to the auxiliary secondary windings 84, which may be connected in a Delta or Wye configuration, as indicated. The VSC 378 has three switching legs 380, 381, 382 if the auxiliary secondary windings 84 are connected in a Delta configuration. If the auxiliary secondary windings 84 are connected in a Wye configuration, a fourth leg 384 may be further included. Each of the switching legs 380-384 includes a pair of switching devices 385 connected in series, each of which may be an insulated gate bipolar transistor (IGBT) and an anti-parallel diode. A control device 386 controls the operation of the switching devices 385. The switching legs 380-384 are connected in parallel with a DC bus 387 that includes a capacitor 388. DC voltage from the DC bus 387 is converted to sinusoidal AC voltages of different phases by the switching legs. A filter 389 is connected between the auxiliary secondary windings 84 and the VSC 78. The filter 389 helps prevent high frequency harmonics from being introduced into the output voltages of the transformer 374 and the currents in the primary and secondary windings 80-84 as a result of the switching of the switching devices 385. The filter 389 comprises inductors and optionally capacitors arranged in a manner similar to that in the filter 160.

Although not shown, another three-phase hybrid transformer may be provided that is substantially a three phase version of the hybrid transformer 90 with a single integrated PEM (and VSC). In this transformer, the electromagnetic transformer has three main primary windings, three auxiliary primary windings and three secondary windings mounted to a ferromagnetic core. This transformer may utilize the PEM 376, except the PEM 376 is connected to the auxiliary primary windings. The PEM 376 is connected to the auxiliary primary windings in the same manner as the PEM 376 is connected to the auxiliary secondary windings 84 in the hybrid transformer 374.

Figure 39:
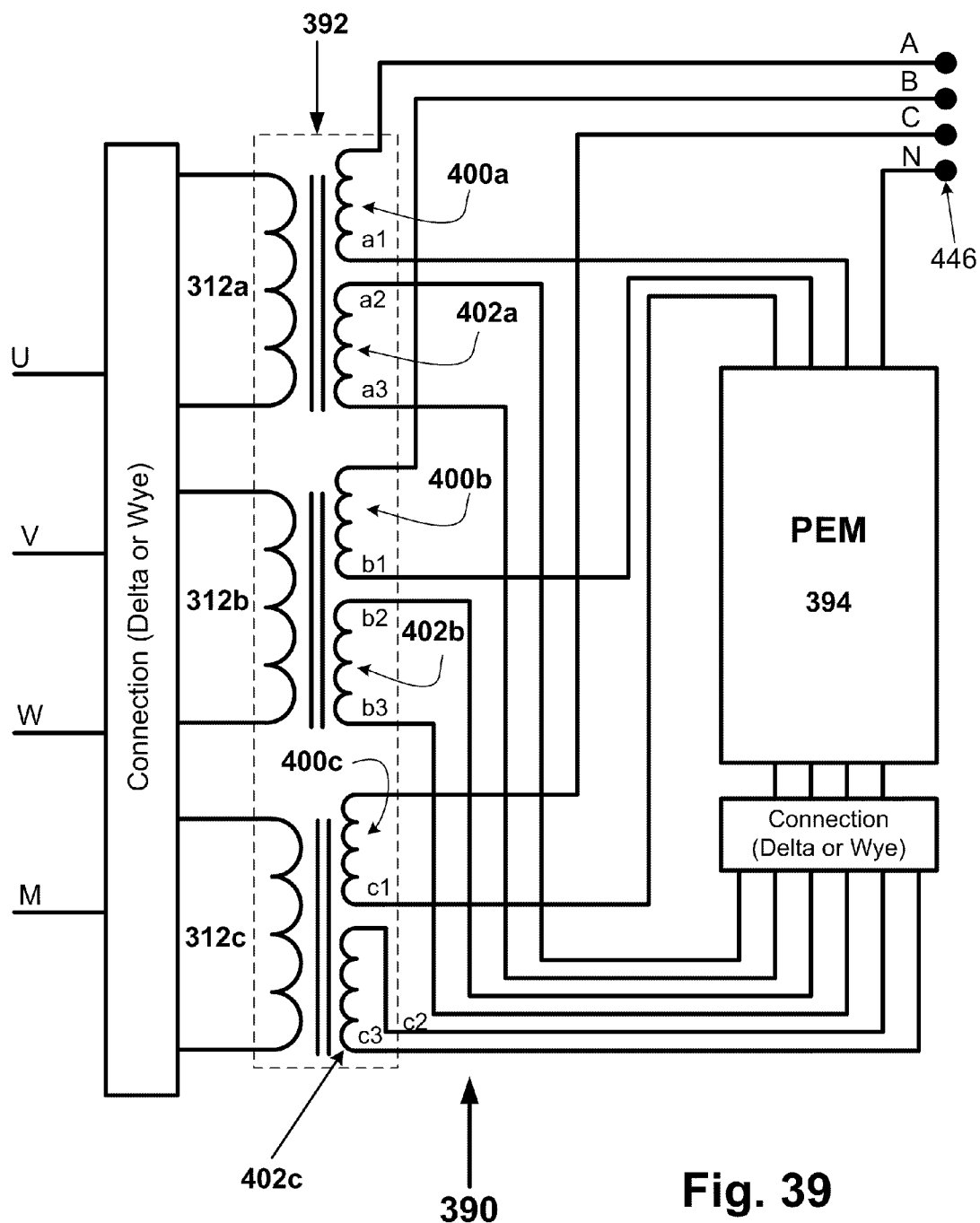
FIG. 39 shows a schematic circuit of a fifth three-phase hybrid transformer.
Figure 40:
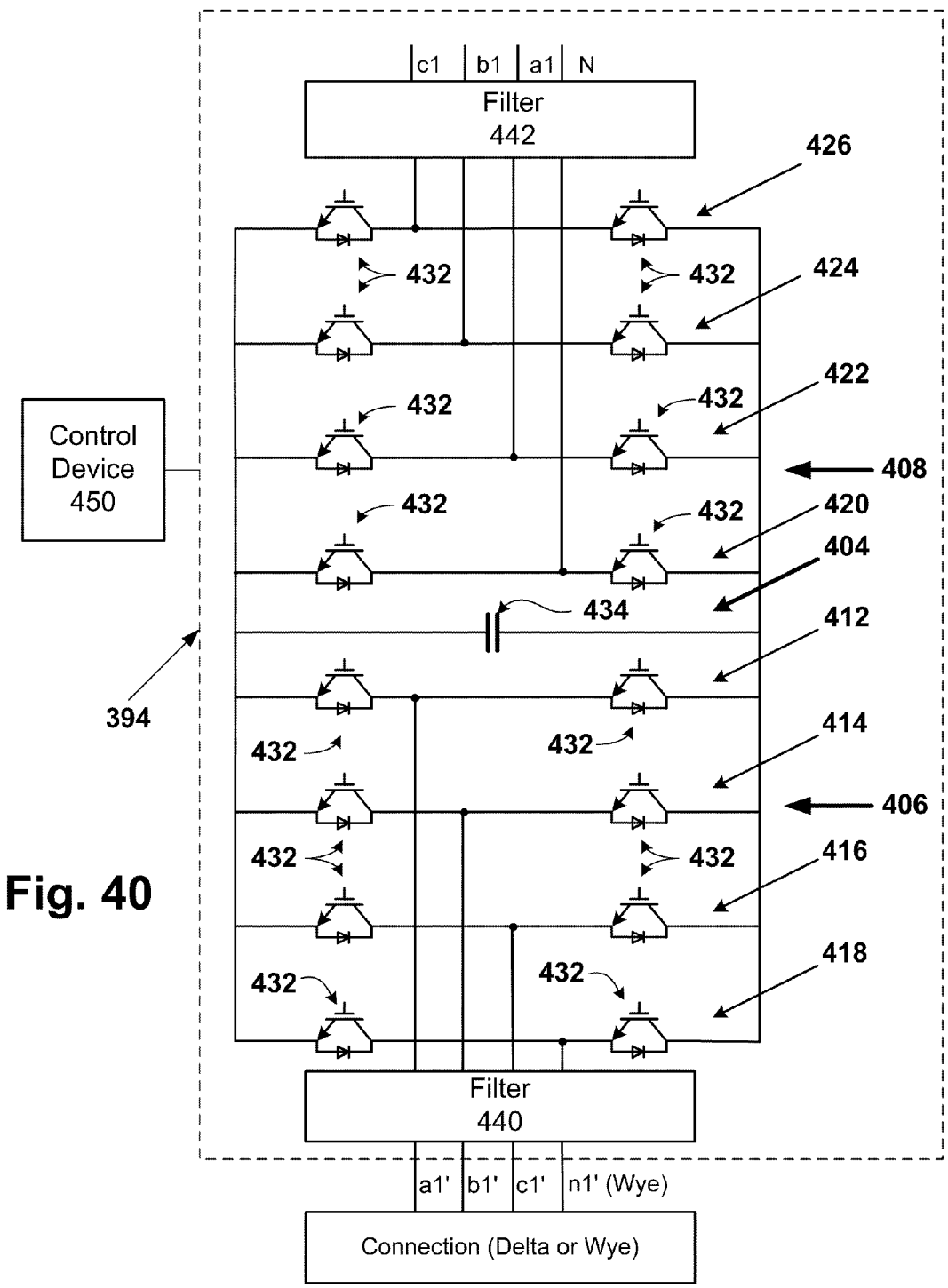
FIG. 40 shows a schematic circuit of a voltage source converter of the fifth three-phase hybrid transformer shown in FIG. 39.
Figure 45:
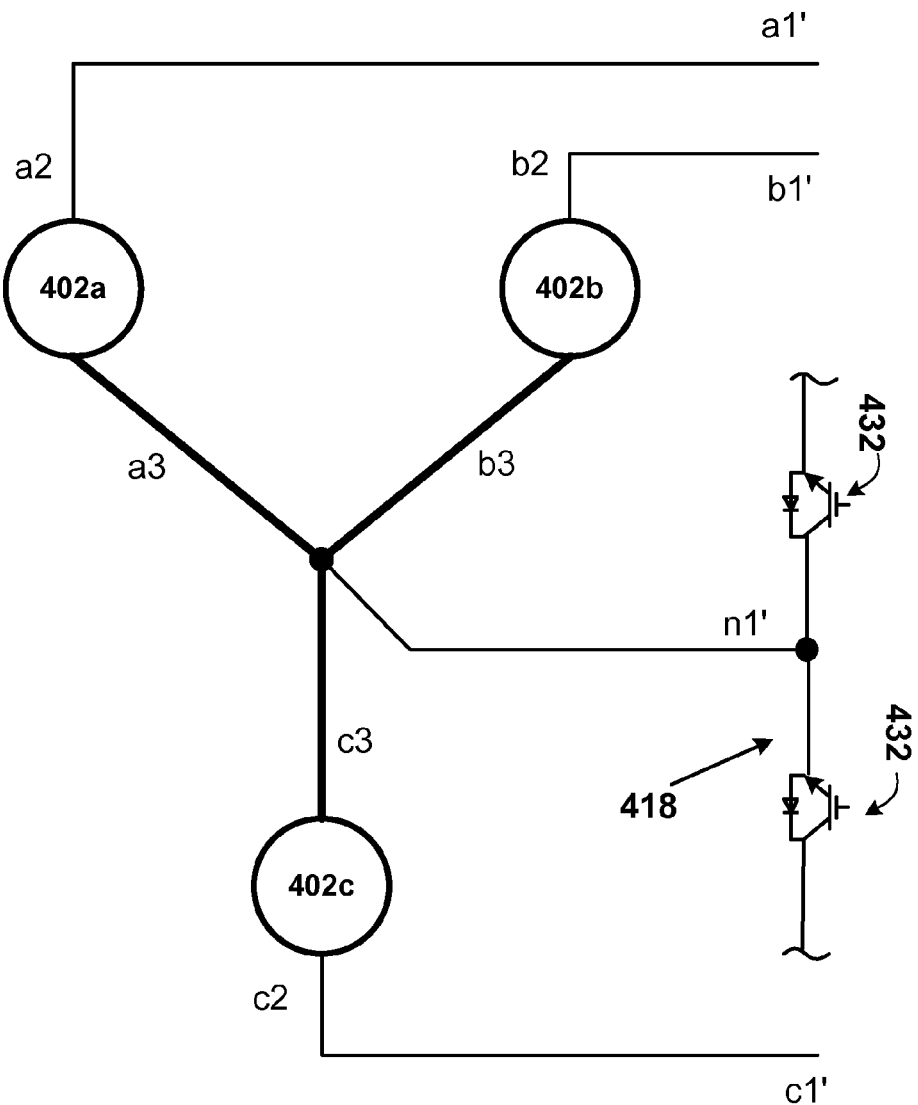
FIG. 45 shows a schematic circuit of windings of the fifth three-phase hybrid transformer connected in a Wye configuration.

Referring now to FIG. 39, there is shown a three-phase hybrid transformer 390 that includes a three-phase electromagnetic transformer 392 and a PEM 394. The electromagnetic transformer 392 includes three primary windings 312a, b,c for connection to a voltage source. For each primary winding 312, there is a main secondary winding 400 and an auxiliary secondary winding 402. The PEM 394 is shown in FIG. 40 and includes a DC bus 404 connected in parallel between first and second bridges 406, 408. The first bridge 406 is connected to the auxiliary secondary windings 402, which may be connected in a Delta or Wye configuration, as indicated. FIG. 45 shows the auxiliary secondary windings 402 connected in a Wye configuration. The first bridge 406 has three switching legs 412, 414, 416 if the auxiliary secondary windings 402 are connected in a Delta configuration. If the auxiliary secondary windings 402 are connected in a Wye configuration, a fourth leg 418 is further included. The second bridge 408 has four switching legs 420, 422, 424, 426. Each of the switching legs 412-426 includes a pair of switching devices 432 connected in series, each of which may be an insulated gate bipolar transistor (IGBT) and an anti-parallel diode. The DC bus 404 includes a capacitor 434.

A first filter 440 is connected between the auxiliary secondary windings 402 on one side and the switching legs 412-418 on the other side. A second filter 442 is connected between the switching legs 420-426 on one side and the main secondary windings 400 and the neutral of the load on the other side. Lines a1', b1', c1' connected through the first filter 440 connect the auxiliary secondary windings 402 to nodes of the switching legs 412-418, respectively, wherein each node is located between the switching devices 432. Lines a1, b1, c1 connected through the filter 442 connect the main secondary windings 400 to nodes of the switching legs 422-426, wherein each node is located between the switching devices 432. Line N connects an output bushing 446 through the filter 442 to a node of the switching leg 420 located between the switching devices 432. The output bushing 446 is adapted for connection to a neutral of the load. The first and second filters 440, 442 help prevent high frequency harmonics from being introduced into the output voltages of the transformer 390 and the currents in the primary and secondary windings 312, 400, 402 as a result of the switching of the switching devices 432. The first and second filters 440, 442 each comprise inductors and optionally capacitors arranged in a manner similar to that in the filter 160, but for three phases.

A control device 450 controls the first bridge 406 to regulate the voltage of the DC bus 404, while also optionally providing other features, such as providing harmonic filtering and improving the primary side power factor by providing reactive power to the load through the transformer coupling. The control device 450 controls the second bridge 408 to maintain the output voltage of the transformer 390 at a set value or reference output voltage and to be a clean sinusoidal waveform. Thus, in the event of a voltage sag, the control device 450 increases the voltage output of the PEM 394 and, in the event of a voltage swell, the control device 450 decreases the voltage output of the PEM 394.

Although not shown a three-phase hybrid transformer may be provided having the same construction as the three-phase versatile transformer 390, except the transformer has main and auxiliary primary windings to which the PEM 394 is connected.

In the three phase hybrid transformers described above, the control device(s) may be an intelligent electronic device (IED) or may interface with an IED, wherein the IED controls and monitors operational aspects of the hybrid transformer in addition to the VSC(s). Such an IED may be substantially similar to and operate in substantially the same manner as the IED 260 described above.

The hybrid transformer of the present invention provides a number of benefits. The PEM is operable to control the power factor on the primary side of the hybrid transformer. In contrast, the power factor on the primary side of a conventional transformer depends on the load. In addition, the PEM is operable to reduce fluctuation in the output voltage of the hybrid transformer in the event of a sag or a swell in the input voltage. The input current of the hybrid transformer is also smaller than that of a conventional transformer because the hybrid transformer generates all the needed reactive power and, thus, the voltage source only provides the real power to the load. The hybrid transformer may be used in datacenters, naval propulsion systems, automotive manufacturing facilities, pharmaceutical plants, hospitals, polymer processing plants, paper mills and wind farms.

Figure 41:
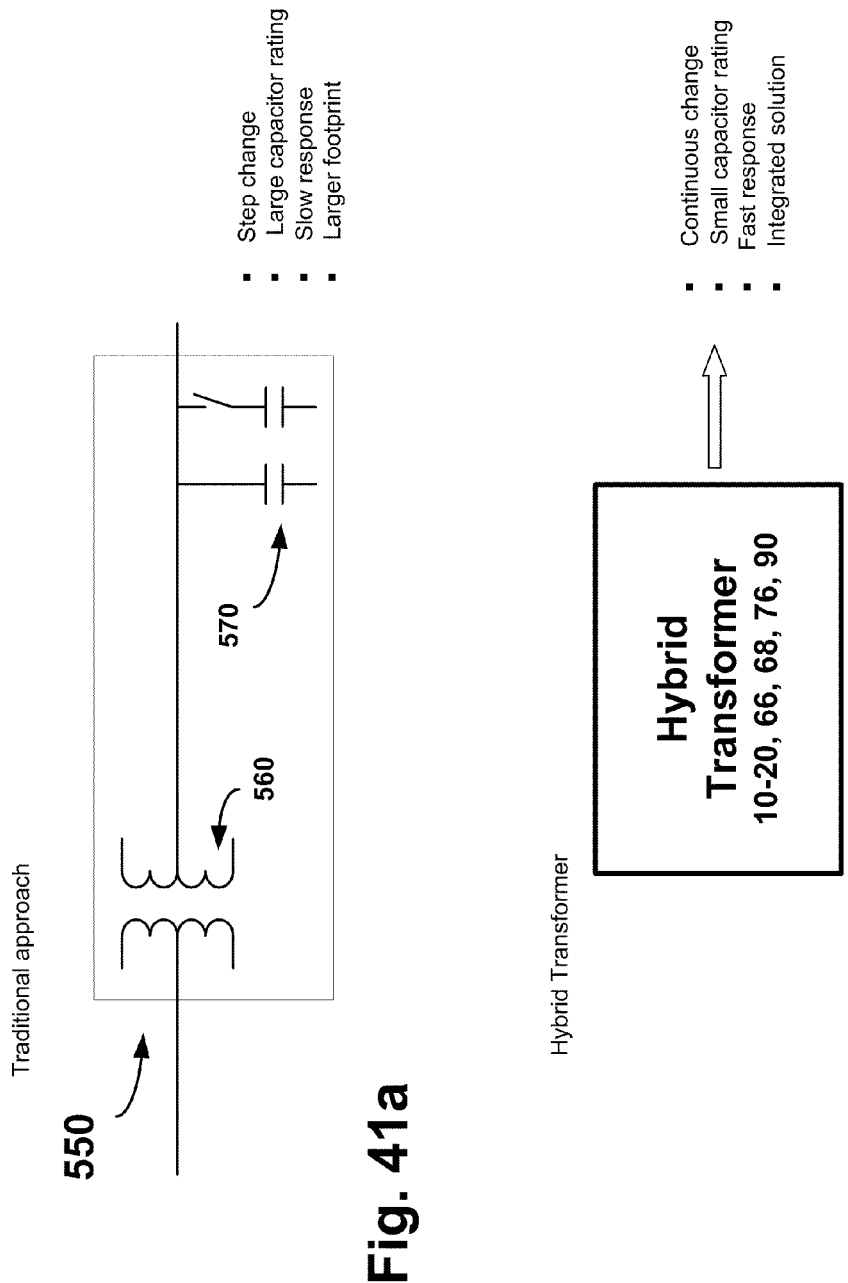
FIG. 41 shows an application of a hybrid transformer of the present invention for power factor correction.

In FIG. 41(a), a conventional power system 550 for power factor correction is shown. The power system 550 includes a conventional electromagnetic transformer 560, and a switchable capacitor bank 570. The capacitor bank 570 is switched by incremental steps to provide reactive power needed for load power factor correction. This method is characterized by a slow response and a large footprint. The hybrid transformer (10-20, 66, 68, 76 or 90) shown in FIG. 41(b) provides a continuous and fast change of reactive power output needed for power factor correction. It provides an integrated solution that requires less capacitor rating and a limited footprint.

Figure 42:
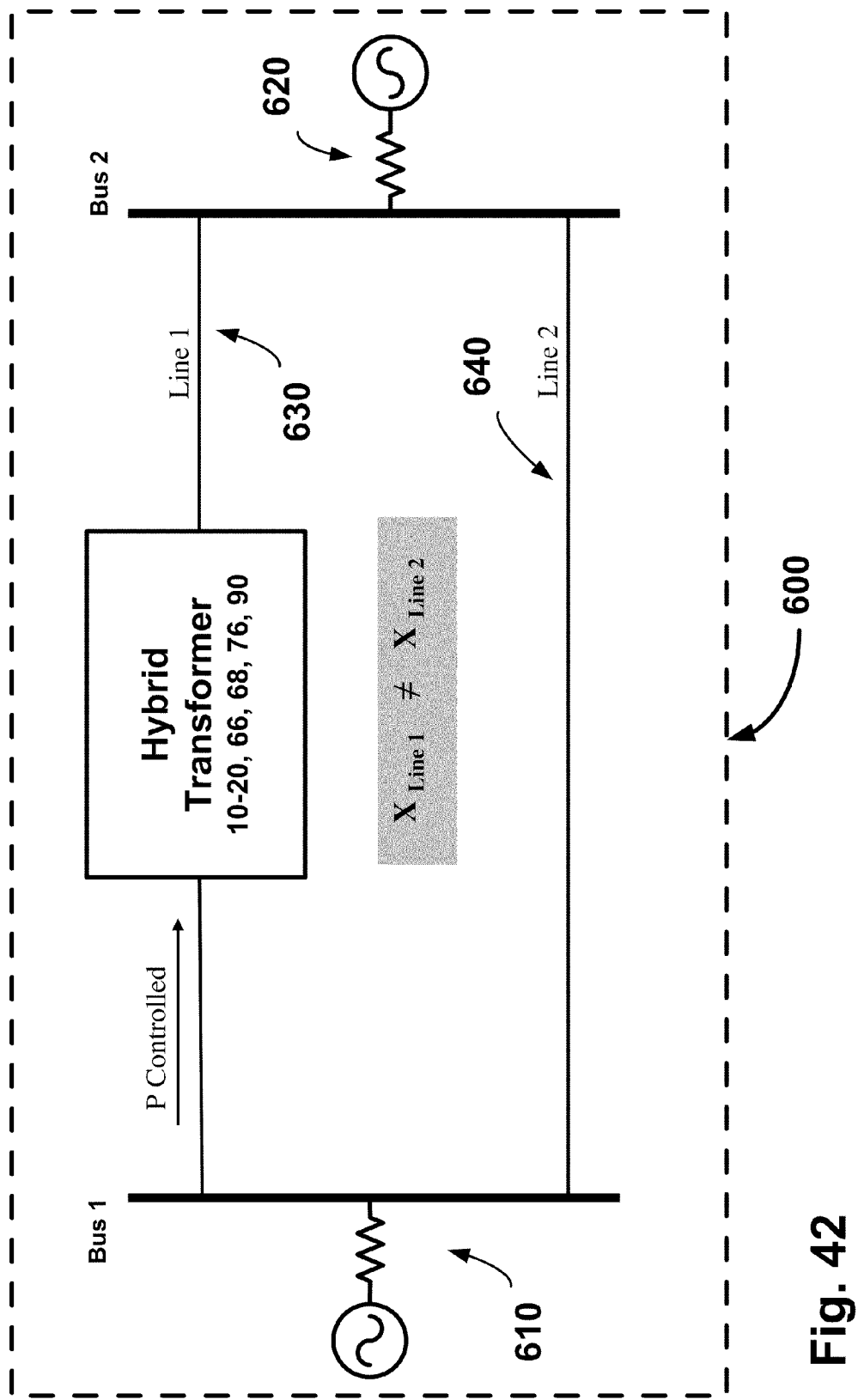
FIG. 42 shows an application of a hybrid transformer of the present invention for phase shifting and power-flow control on parallel lines.

In FIG. 42, a power system 600 connecting two networks 610 and 620 using two parallel lines 630 and 640. In practice, the parallel lines do not have the same impedance and the power flowing in one line is greater that that flowing in the other line. Under heavy load condition, one of the lines 630, 640 may be subjected to thermal overload, thereby causing line sags and mechanical stresses. When the hybrid transformer (10-20, 66, 68, 76 or 90) is placed in series with the line 630, it allows control of power flow through line 630 by imposing a phase shift on the output voltage. The hybrid transformer (10-20, 66, 68, 76 or 90) can be placed in series with both of the lines 630 and 640 and control the power flow on that corridor.

In FIG. 43(*a*), a conventional power system 700 for a data center is shown. The power system 700 includes a conventional electromagnetic transformer 702, a conventional uninterruptible power supply (UPS) 704, a battery bank 706 and a rectifier 708. The UPS 704 and the transformer 702 are connected to an AC voltage source and provide conditioned AC power to AC loads. The UPS 704 is connected to the battery bank 706 to provide AC power in the event of a failure of the voltage source. The rectifier 708 converts the conditioned AC power to DC power that is used to power DC loads, such as computers.

The conventional power system 700 can be replaced by the hybrid transformer (10-20, 66, 68, 76 or 90) having the battery bank 26 connected across the DC output terminals 22 of the hybrid transformer through the switch 28. As shown in FIG. 43(*b*), the DC loads are connected to the DC output terminals of the hybrid transformer (10-20, 66, 68, 76 or 90). Under normal conditions, the battery bank 26 is maintained at full charge, but the switch 28 is open. DC power is provided to the DC loads from the PEM (30 or 31). Upon the occurrence of a power outage, the switch 28 closes and DC power is supplied from the battery bank 26 to the DC loads until AC power is restored or a local generator unit is started.

The hybrid transformer (10-20, 66, 68, 76 or 90) with the battery bank 26 provides the same benefits as the conventional power system 700, but more efficiently and with less equipment.

As will be appreciated by one of skill in the art and as before mentioned, the present invention may be embodied as or take the form of the methods of controlling and monitoring hybrid transformers previously described, a computing device or system having program code configured to carry out the methods, a computer program product on a computer-usable or computer-readable medium having computer-usable or computer-readable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows to achieve the previously described technical results. The program code may execute entirely on the user's computing device, partly on the user's computing device, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A hybrid distribution transformer having a primary side for receiving input voltage and current from a source and a secondary side for providing output voltage and current to a load, the hybrid distribution transformer comprising:
   a ferromagnetic core;
   a winding structure for a power phase, the winding structure comprising one or more first windings and one or more second windings wound around the core, wherein the one or more first windings are disposed on one of the primary side and the secondary side of the transformer and the one or more second windings are disposed on the other one of the primary side and the secondary side of the transformer; and
   a single voltage source converter connected to the winding structure and operable to convert between DC and AC voltages, the voltage source converter comprising:
      at least one switching bridge comprising two or more switching devices;
      a DC bus connected in parallel with the at least one switching bridge; and
      a controller operable to control the at least one switching bridge to control the power factor on the primary side of the hybrid distribution transformer and to reduce variations in the output voltage in the event of a change in the input voltage.

2. The hybrid distribution transformer of claim 1, wherein the one or more first windings comprises a single first winding and wherein the voltage source converter is connected in series with the first winding.

3. The hybrid distribution transformer of claim 2, wherein the one or more second windings comprises a single second winding and wherein the first winding is a primary winding and the second winding is a secondary winding.

4. The hybrid distribution transformer of claim 2, wherein the one or more second windings comprises a single second winding and wherein the first winding is the secondary winding and the second winding is the primary winding.

5. The hybrid distribution transformer of claim 2, further comprising a voltage divider having an output connected between the voltage source converter and the first winding.

6. The hybrid distribution transformer of claim 1, wherein the one or more first windings comprise a pair of first windings and wherein the voltage source converter is connected in parallel with one of the first windings.

7. The hybrid distribution transformer of claim 1, wherein the one or more first windings comprises a single first winding, and wherein the first winding has opposing ends, a plurality of turns disposed between the ends and an inner tap connected to one of the turns, the inner tap helping define first and second winding portions of the first winding, and wherein the voltage source converter is connected to the inner tap of the first winding.

8. The hybrid distribution transformer of claim 7, wherein the input voltage or the output voltage of the hybrid distribution transformer corresponds to the voltage across the first winding portion, and wherein the voltage source converter is connected across the second winding portion.

9. The hybrid distribution transformer of claim 8, wherein the first winding is the primary winding.

10. The hybrid distribution transformer of claim 8, wherein the first winding is the secondary winding.

11. The hybrid distribution transformer of claim 7, wherein the input voltage or the output voltage of the hybrid distribution transformer corresponds to the voltage across an end or outer tap of the first winding portion and a node between two switching devices in a switching bridge of the voltage source converter.

12. The hybrid distribution transformer of claim 11, wherein the first winding is the primary winding.

13. The hybrid distribution transformer of claim 11, wherein the first winding is the secondary winding.

14. The hybrid distribution transformer of claim 1, wherein the voltage source converter is an H-bridge inverter comprising first and second switching bridges connected in parallel with a DC bus.

15. The hybrid distribution transformer of claim 1, wherein the voltage source converter is a half bridge inverter comprising a switching bridge connected in parallel with a DC bus.

16. The hybrid distribution transformer of claim 1, further comprising sensors and an intelligent electronic device (IED) for monitoring the operation of the hybrid distribution transformer, the IED being connected to receive DC power from the DC bus and operable to receive operational data of the hybrid distribution transformer from the sensors, the operational data including currents, voltages and temperatures in the first and second windings.

17. The hybrid distribution transformer of claim 16, wherein the IED comprises the controller and is connected to a remotely located control center by a communication link, the IED being operable to transmit the operational data to the control center and to receive commands for the controller from the control center.

18. The hybrid distribution transformer of claim 1, further comprising a filter connected between the first winding and the voltage source converter, the filter being operable to suppress high frequency harmonics arising from the operation of the switching devices.

19. The hybrid distribution transformer of claim 1, further comprising:
a protection device connected between the voltage source converter and the one or more first windings, the protection device operatively disconnecting the voltage source inverter from the one or more windings in the event the voltage source converter malfunctions.

20. The hybrid distribution transformer of claim 19, wherein the protection device is controlled by the controller and comprises first and second switches and an impedance, and wherein when a network fault is detected, the first switch opens and the second switch closes, thereby directing the fault current to the impedance.

21. A hybrid distribution transformer having a primary side for receiving input voltage and current from a source and a secondary side for providing output voltage and current to a load, the hybrid distribution transformer comprising:

a ferromagnetic core;
first, second and third winding structures, each comprising first and second windings wound around the core, wherein one of the first and second windings is a primary winding for connection to the source and one of the first and second windings is a secondary winding for connection to the load; and
a voltage source converter connected to the first windings and operable to convert between DC and AC voltages, the voltage source converter comprising:
a plurality of switching bridges connected in parallel, each switching bridge comprising two or more switching devices;
a DC bus connected in parallel with the switching bridges; and
a controller operable to control the switching bridges to control the power factor on the primary side of the hybrid distribution transformer and to reduce variations in the output voltage in the event of a change in the input voltage;
wherein each of the first windings has a plurality of turns and a tap connected to one of the turns;
wherein nodes in first, second and third ones of the switching bridges are connected to the taps of the first windings, respectively;
wherein nodes in fourth, fifth and sixth ones of the switching bridges are connected to ends of the first windings, respectively;
wherein a node in a seventh one of the switching bridges is connected to a bushing adapted for connection to the voltage source or the load; and
wherein in each of the switching bridges, the node is located between the switching devices.

22. The hybrid distribution transformer of claim 21, wherein the second windings are secondary windings for connection to the load and the bushing is an output bushing adapted for connection to the load.

23. A hybrid distribution transformer having a primary side for receiving input voltages and currents from a source and a secondary side for providing output voltages and currents to a load, the hybrid distribution transformer comprising:
(a.) a ferromagnetic core;
(b.) three winding assemblies mounted to the core, each winding assembly comprising a first, second and third windings, one of the first and second windings being a primary winding for connection to the voltage source and the other one of the first and second windings being a secondary winding for connection to the load, the third winding being an auxiliary primary winding or an auxiliary secondary winding;
(c.) a single integrated voltage source converter connected to the second and third windings of each of the winding assemblies, the converter comprising:
a first bridge comprising first, second and third circuit legs connected in parallel, each of the first, second and third circuit legs comprising a pair of semiconductor switches connected in series, wherein nodes in the first, second and third circuit legs are connected to ends of the third windings, respectively, and wherein in each of the first, second and third circuit legs, the node is located between the semiconductor switches; and
a second bridge comprising fourth, fifth and sixth circuit legs connected in parallel, each of the fourth, fifth and sixth circuit legs comprising a pair of semiconductor switches connected in series, wherein nodes in the fourth, fifth and sixth legs are connected to ends of the second windings, respectively, and wherein in each of the fourth, fifth and sixth circuit legs, the node is located between the semiconductor switches;

a DC bus connected in parallel with the first and second bridges; and (d.) a controller operable to control the converter to control the power factor on the primary side of the hybrid distribution transformer and to reduce variations in the output voltages in the event of changes in the input voltage.

24. The hybrid distribution transformer of claim 23, wherein the DC bridge is connected between the first and second bridges and comprises a capacitor.

25. The hybrid distribution transformer of claim 23, wherein the second bridge further comprises a seventh circuit leg comprising a pair of semiconductor switches connected in series, the seventh circuit leg being connected at a node to a bushing adapted for connection to the voltage source or the load, the node being located between the semiconductor switches.

26. The hybrid distribution transformer of claim 25, wherein the second windings are main secondary windings for connection to the load, the third windings are auxiliary secondary windings and the bushing is an output bushing adapted for connection to the load.

27. The hybrid distribution transformer of claim 26, wherein the third windings are connected in a Wye configuration, and wherein the first bridge further comprises an eighth circuit leg comprising a pair of semiconductor switches connected in series, the eighth circuit leg being connected at a node to a neutral of the Wye configuration, the node being located between the semiconductor switches.

28. The hybrid distribution transformer of claim 23, further comprising sensors and an intelligent electronic device (IED) for monitoring the operation of the hybrid distribution transformer, the IED being connected to receive DC power from the DC bus and operable to receive operational data of the hybrid distribution transformer from the sensors, the operational data including currents, voltages and temperatures in the first and second windings.

29. The hybrid distribution transformer of claim 23, wherein the IED comprises the controller and is connected to a remotely located control center by a communication link, the IED being operable to transmit the operational data to the control center and to receive commands for the controller from the control center.

* * * * *